US011023585B1

(12) United States Patent
Light et al.

(10) Patent No.: US 11,023,585 B1
(45) Date of Patent: Jun. 1, 2021

(54) SYSTEMS AND METHODS FOR MANAGING CYBERSECURITY ALERTS

(71) Applicant: BitSight Technologies, Inc., Boston, MA (US)

(72) Inventors: Marc Noel Light, Somerville, MA (US); Tianyi Cai, Brookline, MA (US); Thomas Erhardt Montroy, Cambridge, MA (US)

(73) Assignee: BitSight Technologies, Inc., Boston, MA (US)

( * ) Notice: Subject to any disclaimer, the term of this patent is extended or adjusted under 35 U.S.C. 154(b) by 0 days.

(21) Appl. No.: 16/884,607

(22) Filed: May 27, 2020

(51) Int. Cl.
G06F 21/57 (2013.01)

(52) U.S. Cl.
CPC ........ G06F 21/57 (2013.01); *G06F 2221/034* (2013.01)

(58) Field of Classification Search
None
See application file for complete search history.

(56) References Cited

U.S. PATENT DOCUMENTS

| | | | |
|---|---|---|---|
| 5,867,799 A | 2/1999 | Lang et al. | |
| 6,016,475 A | 1/2000 | Miller et al. | |
| 6,792,401 B1 | 9/2004 | Nigro et al. | |
| 7,062,572 B1 | 6/2006 | Hampton | |
| D525,264 S | 7/2006 | Chotai | |
| D525,629 S | 7/2006 | Chotai | |
| 7,100,195 B1 | 8/2006 | Underwood | |
| 7,194,769 B2 | 3/2007 | Lippmann et al. | |
| 7,290,275 B2 | 10/2007 | Baudoin et al. | |
| D604,740 S | 11/2009 | Matheny | |
| 7,650,570 B2 | 1/2010 | Torrens | |
| 7,747,778 B1 | 6/2010 | King | |
| 7,748,038 B2 | 6/2010 | Olivier et al. | |

(Continued)

FOREIGN PATENT DOCUMENTS

| | | |
|---|---|---|
| WO | WO-2017/142694 A1 | 8/2017 |
| WO | WO-2019/023045 A1 | 1/2019 |

OTHER PUBLICATIONS

"Agreed Upon Procedures," Version 4.0, BITS, The Financial Institution Shared Assessments Program, Assessment Guide, Sep. 2008, 56 pages.

(Continued)

*Primary Examiner* — Joseph P Hirl
*Assistant Examiner* — Hassan Saadoun
(74) *Attorney, Agent, or Firm* — Goodwin Procter LLP

(57) ABSTRACT

A system and method for setting alert thresholds related to cybersecurity ratings of one or more affiliate entities. An example method includes: obtaining entity data including cybersecurity event data for an affiliate entity; calculating a time-series cybersecurity rating for the affiliate entity based on the entity data; associating an alert reporting threshold with the time-series cybersecurity rating, wherein a comparison of the alert reporting threshold to the time-series cybersecurity rating determines a number of alerts reported for the affiliate entity; applying an alternative alert reporting threshold against the time-series cybersecurity rating to determine an alternative number of alerts reported for the affiliate entity; and updating the alert reporting threshold for the time-series cybersecurity rating to the alternative alert reporting threshold.

20 Claims, 11 Drawing Sheets

(56) References Cited

U.S. PATENT DOCUMENTS

| | | |
|---|---|---|
| 7,827,607 B2 | 11/2010 | Sobel et al. |
| D630,645 S | 1/2011 | Tokunaga |
| 7,971,252 B2 | 6/2011 | Lippmann et al. |
| D652,048 S | 1/2012 | Joseph |
| D667,022 S | 9/2012 | LoBosco |
| 8,370,933 B1 | 2/2013 | Buckler |
| 8,429,630 B2 | 4/2013 | Nickolov et al. |
| D682,287 S | 5/2013 | Cong |
| D688,260 S | 8/2013 | Pearcy |
| 8,504,556 B1 | 8/2013 | Rice et al. |
| D691,164 S | 10/2013 | Lim |
| D694,252 S | 11/2013 | Helm |
| D694,253 S | 11/2013 | Helm |
| 8,601,575 B2 * | 12/2013 | Mullarkey .............. H04L 43/16 726/22 |
| 8,621,621 B1 | 12/2013 | Burns et al. |
| 8,661,146 B2 | 2/2014 | Alex et al. |
| D700,616 S | 3/2014 | Chao |
| 8,677,481 B1 | 3/2014 | Lee |
| 8,825,662 B1 | 9/2014 | Kingman et al. |
| D730,918 S | 6/2015 | Park |
| 9,053,210 B2 | 6/2015 | Elnikety |
| 9,075,990 B1 | 7/2015 | Yang |
| D740,847 S | 10/2015 | Yampolskiy et al. |
| D740,848 S | 10/2015 | Bolts |
| D741,351 S | 10/2015 | Kito |
| D746,832 S | 1/2016 | Pearcy |
| 9,241,252 B2 | 1/2016 | Dua et al. |
| 9,244,899 B1 | 1/2016 | Greenbaum |
| 9,294,498 B1 | 3/2016 | Yampolskiy et al. |
| D754,690 S | 4/2016 | Park |
| D754,696 S | 4/2016 | Follett |
| D756,371 S | 5/2016 | Bertnick |
| D756,372 S | 5/2016 | Bertnick |
| D756,392 S | 5/2016 | Yun |
| D759,084 S | 6/2016 | Yampolskiy et al. |
| D759,689 S | 6/2016 | Olson |
| 9,372,994 B1 | 6/2016 | Yampolskiy et al. |
| D760,782 S | 7/2016 | Kendler |
| 9,384,206 B1 | 7/2016 | Bono et al. |
| 9,401,926 B1 | 7/2016 | Dubow et al. |
| 9,407,658 B1 | 8/2016 | Kuskov et al. |
| 9,424,333 B1 | 8/2016 | Bisignani |
| D771,695 S | 11/2016 | Yampolskiy et al. |
| D772,276 S | 11/2016 | Yampolskiy et al. |
| 9,501,647 B2 | 11/2016 | Yampolskiy et al. |
| D773,507 S | 12/2016 | Sagrillo |
| D775,635 S | 1/2017 | Raji |
| D776,136 S | 1/2017 | Chen |
| D776,153 S | 1/2017 | Yampolskiy et al. |
| D777,177 S | 1/2017 | Chen |
| 9,560,072 B1 | 1/2017 | Xu |
| D778,927 S | 2/2017 | Bertnick |
| D778,928 S | 2/2017 | Bertnick |
| D779,512 S | 2/2017 | Kimura |
| D779,514 S | 2/2017 | Baris |
| D779,531 S | 2/2017 | List |
| D780,770 S | 3/2017 | Sum |
| D785,009 S | 4/2017 | Lim |
| D785,010 S | 4/2017 | Bachman |
| D785,016 S | 4/2017 | Berwick |
| 9,620,079 B2 | 4/2017 | Curtis |
| D787,530 S | 5/2017 | Huang |
| D788,128 S | 5/2017 | Wada |
| 9,641,547 B2 | 5/2017 | Yampolskiy et al. |
| 9,646,110 B2 | 5/2017 | Byrne |
| D789,947 S | 6/2017 | Sun |
| D789,957 S | 6/2017 | Wu |
| D791,153 S | 7/2017 | Rice |
| D791,834 S | 7/2017 | Eze |
| D792,427 S | 7/2017 | Weaver |
| D795,891 S | 8/2017 | Kohan |
| D796,523 S | 9/2017 | Bhandari |
| D801,989 S | 11/2017 | Iketsuki |
| D803,237 S | 11/2017 | Wu |
| D804,528 S | 12/2017 | Martin |
| D806,735 S | 1/2018 | Olsen |
| D806,737 S | 1/2018 | Chung |
| D809,523 S | 2/2018 | Lipka |
| D812,633 S | 3/2018 | Saneii |
| D814,483 S | 4/2018 | Gavaskar |
| D815,119 S | 4/2018 | Chalker |
| D815,148 S | 4/2018 | Martin |
| D816,105 S | 4/2018 | Rudick |
| D816,116 S | 4/2018 | Selassie |
| 9,954,893 B1 | 4/2018 | Zhao et al. |
| D817,970 S | 5/2018 | Chang |
| D817,977 S | 5/2018 | Kato |
| D819,687 S | 6/2018 | Yampolskiy et al. |
| 10,044,750 B2 | 8/2018 | Livshits et al. |
| 10,079,854 B1 | 9/2018 | Scott et al. |
| 10,142,364 B2 | 11/2018 | Baukes et al. |
| 10,185,924 B1 | 1/2019 | McClintock et al. |
| 10,217,071 B2 | 2/2019 | Mo et al. |
| 10,230,753 B2 | 3/2019 | Yampolskiy et al. |
| 10,230,764 B2 | 3/2019 | Ng et al. |
| 10,235,524 B2 | 3/2019 | Ford |
| 10,257,219 B1 | 4/2019 | Geil et al. |
| 10,305,854 B2 | 5/2019 | Alizadeh-Shabdiz et al. |
| 10,331,502 B1 | 6/2019 | Hart |
| 10,339,321 B2 | 7/2019 | Tedeschi |
| 10,339,484 B2 | 7/2019 | Pai et al. |
| 10,412,083 B2 | 9/2019 | Zou et al. |
| 10,469,515 B2 | 11/2019 | Helmsen et al. |
| 10,491,619 B2 | 11/2019 | Yampolskiy et al. |
| 10,491,620 B2 | 11/2019 | Yampolskiy et al. |
| 10,521,583 B1 | 12/2019 | Bagulho Monteiro Pereira |
| D880,512 S | 4/2020 | Greenwald et al. |
| 2001/0044798 A1 | 11/2001 | Nagral et al. |
| 2002/0083077 A1 | 6/2002 | Vardi |
| 2002/0133365 A1 | 9/2002 | Grey et al. |
| 2002/0164983 A1 | 11/2002 | Raviv et al. |
| 2003/0050862 A1 | 3/2003 | Bleicken et al. |
| 2003/0123424 A1 | 7/2003 | Jung |
| 2003/0187967 A1 | 10/2003 | Walsh et al. |
| 2004/0003284 A1 | 1/2004 | Campbell et al. |
| 2004/0010709 A1 | 1/2004 | Baudoin et al. |
| 2004/0024859 A1 | 2/2004 | Bloch et al. |
| 2004/0098375 A1 | 5/2004 | DeCarlo |
| 2004/0133561 A1 | 7/2004 | Burke |
| 2004/0193907 A1 | 9/2004 | Patanella |
| 2004/0193918 A1 | 9/2004 | Green et al. |
| 2004/0199791 A1 | 10/2004 | Poletto et al. |
| 2004/0199792 A1 | 10/2004 | Tan et al. |
| 2004/0221296 A1 | 11/2004 | Ogielski et al. |
| 2004/0250122 A1 | 12/2004 | Newton |
| 2004/0250134 A1 | 12/2004 | Kohler et al. |
| 2005/0066195 A1 | 3/2005 | Jones |
| 2005/0071450 A1 | 3/2005 | Allen et al. |
| 2005/0076245 A1 | 4/2005 | Graham et al. |
| 2005/0080720 A1 | 4/2005 | Betz et al. |
| 2005/0108415 A1 | 5/2005 | Turk et al. |
| 2005/0131830 A1 | 6/2005 | Juarez et al. |
| 2005/0138413 A1 | 6/2005 | Lippmann et al. |
| 2005/0160002 A1 | 7/2005 | Roetter et al. |
| 2005/0278726 A1 | 12/2005 | Cano |
| 2006/0036335 A1 | 2/2006 | Banter |
| 2006/0107226 A1 | 5/2006 | Matthews |
| 2006/0173992 A1 | 8/2006 | Weber et al. |
| 2006/0212925 A1 | 9/2006 | Shull et al. |
| 2006/0253581 A1 | 11/2006 | Dixon et al. |
| 2007/0016948 A1 | 1/2007 | Dubrovsky et al. |
| 2007/0067845 A1 | 3/2007 | Werner et al. |
| 2007/0143851 A1 | 6/2007 | Nicodemus et al. |
| 2007/0179955 A1 | 8/2007 | Croft et al. |
| 2007/0198275 A1 | 8/2007 | Malden et al. |
| 2007/0214151 A1 | 9/2007 | Thomas et al. |
| 2007/0282730 A1 | 12/2007 | Carpenter et al. |
| 2008/0033775 A1 | 2/2008 | Dawson et al. |
| 2008/0047018 A1 | 2/2008 | Baudoin et al. |
| 2008/0091834 A1 | 4/2008 | Norton |
| 2008/0140495 A1 | 6/2008 | Bhamidipaty et al. |
| 2008/0140728 A1 | 6/2008 | Fraser et al. |
| 2008/0162931 A1 | 7/2008 | Lord et al. |

(56) References Cited

U.S. PATENT DOCUMENTS

| | | |
|---|---|---|
| 2008/0172382 A1 | 7/2008 | Prettejohn |
| 2008/0208995 A1 | 8/2008 | Takahashi et al. |
| 2008/0209565 A2 | 8/2008 | Baudoin et al. |
| 2008/0222287 A1 | 9/2008 | Bahl et al. |
| 2008/0262895 A1 | 10/2008 | Hofmeister et al. |
| 2009/0044272 A1 | 2/2009 | Jarrett |
| 2009/0094265 A1 | 4/2009 | Vlachos et al. |
| 2009/0125427 A1 | 5/2009 | Atwood et al. |
| 2009/0132861 A1 | 5/2009 | Costa et al. |
| 2009/0161629 A1 | 6/2009 | Purkayastha et al. |
| 2009/0193054 A1 | 7/2009 | Karimisetty et al. |
| 2009/0216700 A1 | 8/2009 | Bouchard et al. |
| 2009/0265787 A9 | 10/2009 | Baudoin et al. |
| 2009/0293128 A1 | 11/2009 | Lippmann et al. |
| 2009/0299802 A1 | 12/2009 | Brennan |
| 2009/0300768 A1 | 12/2009 | Krishnamurthy et al. |
| 2009/0319420 A1 | 12/2009 | Sanchez et al. |
| 2009/0323632 A1 | 12/2009 | Nix |
| 2009/0328063 A1 | 12/2009 | Corvera et al. |
| 2010/0017880 A1 | 1/2010 | Masood |
| 2010/0042605 A1 | 2/2010 | Cheng et al. |
| 2010/0057582 A1 | 3/2010 | Arfin |
| 2010/0186088 A1 | 7/2010 | Banerjee et al. |
| 2010/0205042 A1 | 8/2010 | Mun |
| 2010/0218256 A1 | 8/2010 | Thomas et al. |
| 2010/0262444 A1 | 10/2010 | Atwal et al. |
| 2010/0275263 A1 | 10/2010 | Bennett et al. |
| 2010/0281124 A1 | 11/2010 | Westman et al. |
| 2010/0281151 A1 | 11/2010 | Ramankutty et al. |
| 2011/0137704 A1 | 6/2011 | Mitra |
| 2011/0145576 A1 | 6/2011 | Bettan |
| 2011/0185403 A1 | 7/2011 | Dolan et al. |
| 2011/0213742 A1 | 9/2011 | Lemmond et al. |
| 2011/0219455 A1 | 9/2011 | Bhagwan et al. |
| 2011/0231395 A1 | 9/2011 | Vadlamani |
| 2011/0239300 A1 | 9/2011 | Klein et al. |
| 2011/0296519 A1 | 12/2011 | Ide et al. |
| 2012/0036263 A1 | 2/2012 | Madden et al. |
| 2012/0089745 A1 | 4/2012 | Turakhia |
| 2012/0158725 A1 | 6/2012 | Molloy et al. |
| 2012/0166458 A1 | 6/2012 | Laudanski et al. |
| 2012/0198558 A1 | 8/2012 | Liu et al. |
| 2012/0215892 A1 | 8/2012 | Wanser |
| 2012/0255027 A1 | 10/2012 | Kanakapura et al. |
| 2012/0291129 A1 | 11/2012 | Shulman et al. |
| 2013/0014253 A1 | 1/2013 | Vivian et al. |
| 2013/0060351 A1 | 3/2013 | Imming et al. |
| 2013/0080505 A1 | 3/2013 | Nielsen et al. |
| 2013/0086521 A1 | 4/2013 | Grossele |
| 2013/0091574 A1 | 4/2013 | Howes et al. |
| 2013/0124644 A1 | 5/2013 | Hunt et al. |
| 2013/0124653 A1 | 5/2013 | Vick et al. |
| 2013/0142050 A1 | 6/2013 | Luna |
| 2013/0173791 A1 | 7/2013 | Longo |
| 2013/0227078 A1 | 8/2013 | Wei et al. |
| 2013/0291105 A1 | 10/2013 | Zheng |
| 2013/0298244 A1 | 11/2013 | Kumar et al. |
| 2013/0305368 A1 | 11/2013 | Ford |
| 2013/0333038 A1 | 12/2013 | Chien |
| 2013/0347116 A1 | 12/2013 | Flores |
| 2014/0006129 A1 | 1/2014 | Heath |
| 2014/0019196 A1 | 1/2014 | Wiggins |
| 2014/0108474 A1 | 4/2014 | David et al. |
| 2014/0114755 A1 | 4/2014 | Mezzacca |
| 2014/0114843 A1 | 4/2014 | Klein et al. |
| 2014/0130158 A1 | 5/2014 | Wang et al. |
| 2014/0146370 A1 | 5/2014 | Banner et al. |
| 2014/0189098 A1 | 7/2014 | MaGill et al. |
| 2014/0204803 A1 | 7/2014 | Nguyen et al. |
| 2014/0244317 A1 | 8/2014 | Roberts et al. |
| 2014/0283068 A1 | 9/2014 | Call et al. |
| 2014/0288996 A1 | 9/2014 | Rence et al. |
| 2014/0304816 A1 | 10/2014 | Klein et al. |
| 2014/0337633 A1 | 11/2014 | Yang et al. |
| 2015/0033331 A1 | 1/2015 | Stern et al. |
| 2015/0033341 A1 | 1/2015 | Schmidtler et al. |
| 2015/0074579 A1 | 3/2015 | Gladstone et al. |
| 2015/0081860 A1 | 3/2015 | Kuehnel et al. |
| 2015/0156084 A1 | 6/2015 | Kaminsky et al. |
| 2015/0180883 A1 | 6/2015 | Aktas et al. |
| 2015/0261955 A1 | 9/2015 | Huang et al. |
| 2015/0264061 A1 | 9/2015 | Ibatullin et al. |
| 2015/0288706 A1 | 10/2015 | Marshall |
| 2015/0288709 A1 | 10/2015 | Singhal et al. |
| 2015/0310188 A1 | 10/2015 | Ford et al. |
| 2015/0310213 A1 | 10/2015 | Ronen et al. |
| 2015/0317672 A1 | 11/2015 | Espinoza et al. |
| 2015/0347756 A1 | 12/2015 | Hidayat et al. |
| 2015/0350229 A1 | 12/2015 | Mitchell |
| 2015/0381649 A1 | 12/2015 | Schultz et al. |
| 2016/0036849 A1 | 2/2016 | Zakian |
| 2016/0065613 A1 | 3/2016 | Cho et al. |
| 2016/0119373 A1 | 4/2016 | Fausto et al. |
| 2016/0140466 A1 | 5/2016 | Sidebottom |
| 2016/0147992 A1 | 5/2016 | Zhao et al. |
| 2016/0162602 A1 | 6/2016 | Bradish et al. |
| 2016/0171415 A1 | 6/2016 | Yampolskiy et al. |
| 2016/0173522 A1 | 6/2016 | Yampolskiy et al. |
| 2016/0182537 A1 | 6/2016 | Tatourian et al. |
| 2016/0189301 A1 | 6/2016 | Ng et al. |
| 2016/0191554 A1 | 6/2016 | Kaminsky |
| 2016/0205126 A1 | 7/2016 | Boyer et al. |
| 2016/0248797 A1 | 8/2016 | Yampolskiy et al. |
| 2016/0253500 A1 | 9/2016 | Alme et al. |
| 2016/0259945 A1 | 9/2016 | Yampolskiy et al. |
| 2016/0337387 A1 | 11/2016 | Hu et al. |
| 2016/0344801 A1 | 11/2016 | Akkarawittayapoom |
| 2016/0364496 A1 | 12/2016 | Li |
| 2016/0373485 A1 | 12/2016 | Kamble |
| 2016/0378978 A1* | 12/2016 | Singla .................. G06F 21/554 726/23 |
| 2017/0048267 A1 | 2/2017 | Yampolskiy et al. |
| 2017/0063901 A1 | 3/2017 | Muddu et al. |
| 2017/0161409 A1 | 6/2017 | Martin |
| 2017/0236078 A1 | 8/2017 | Rasumov |
| 2017/0237764 A1 | 8/2017 | Rasumov |
| 2017/0279843 A1 | 9/2017 | Schultz et al. |
| 2017/0300911 A1 | 10/2017 | Alnajem |
| 2017/0316324 A1 | 11/2017 | Barrett et al. |
| 2017/0318045 A1 | 11/2017 | Johns et al. |
| 2017/0324766 A1 | 11/2017 | Gonzalez |
| 2017/0337487 A1 | 11/2017 | Nock et al. |
| 2018/0013716 A1 | 1/2018 | Connell et al. |
| 2018/0103043 A1 | 4/2018 | Kupreev et al. |
| 2018/0123934 A1 | 5/2018 | Gissing et al. |
| 2018/0124110 A1 | 5/2018 | Hunt et al. |
| 2018/0139180 A1 | 5/2018 | Napchi et al. |
| 2018/0157468 A1 | 6/2018 | Stachura |
| 2018/0322584 A1 | 11/2018 | Crabtree et al. |
| 2018/0336348 A1 | 11/2018 | Ng et al. |
| 2018/0337938 A1 | 11/2018 | Kneib et al. |
| 2018/0337941 A1 | 11/2018 | Kraning et al. |
| 2018/0365519 A1 | 12/2018 | Pollard et al. |
| 2018/0375896 A1 | 12/2018 | Wang et al. |
| 2019/0034845 A1 | 1/2019 | Mo et al. |
| 2019/0089711 A1 | 3/2019 | Faulkner |
| 2019/0098025 A1 | 3/2019 | Lim |
| 2019/0140925 A1 | 5/2019 | Pon et al. |
| 2019/0147378 A1 | 5/2019 | Mo et al. |
| 2019/0303574 A1 | 10/2019 | Lamay et al. |
| 2019/0379632 A1 | 12/2019 | Dahlberg et al. |
| 2019/0392252 A1 | 12/2019 | Fighel et al. |
| 2020/0053127 A1 | 2/2020 | Brotherton et al. |
| 2020/0074084 A1 | 3/2020 | Dorrans et al. |

OTHER PUBLICATIONS

"An Executive View of IT Governance," IT Governance Institute, 2009, 32 pages.

"Assessing Risk in Turbulent Times," A Workshop for Information Security Executives, Glassmeyter/McNamee Center for Digital Strategies, Tuck School of Business at Dartmouth, Institute for Information Infrastructure Protection, 2009, 17 pages.

(56) References Cited

OTHER PUBLICATIONS

"Assuring a Trusted and Resilient Information and Communications Infrastructure," Cyberspace Policy Review, May 2009, 76 pages.
"Master Security Criteria," Version 3.0, BITS Financial Services Security Laboratory, Oct. 2001, 47 pages.
"Plugging the Right Holes," Lab Notes, MIT Lincoln Library, Posted Jul. 2008, retrieved Sep. 14, 2010 from http://www.ll.miLedufpublicationsflabnotesfpluggingtherightho! . . . , 2 pages.
"Report on Controls Placed in Operation and Test of Operating Effectiveness," EasCorp, Jan. 1 through Dec. 31, 2008, prepared by Crowe Horwath, 58 pages.
"Shared Assessments: Getting Started," BITS, 2008, 4 pages.
"Twenty Critical Controls for Effective Cyber Defense: Consensus Audit," Version 2.3, Nov. 13, 2009, retrieved on Apr. 9, 2010 from http://www.sans.org/critical-security-controls/print.php., 52 pages.
2009 Data Breach Investigations Report, study conducted by Verizon Business RISK Team, 52 pages.
Artz, Michael Lyle, "NetSPA: A Network Security Planning Architecture," Massachusetts Institute of Technology, May 24, 2002, 97 pages.
Boyer, Stephen, et al., Playing with Blocks: SCAP-Enable Higher-Level Analyses, MIT Lincoln Laboratory, 5th Annual IT Security Automation Conference, Oct. 26-29, 2009, 35 pages.
Browne, Niall, et al., "Shared Assessments Program AUP and SAS70 Frequently Asked Questions," BITS, 4 pages.
Buckshaw, Donald L., "Use of Decision Support Techniques for Information System Risk Management," submitted for publication in Wiley's Encyclopedia of Quantitative Risk Assessment in Jan. 2007, 11 pages.
Buehler, Kevin S., et al., "Running with risk," The McKinsey Quarterly, No. 4, 2003, pp. 40-49.
Chu, Matthew, et al., "Visualizing Attack Graphs, Reachability, and Trust Relationships with NAVIGATOR," MIT Lincoln Library, VizSEC '10, Ontario, Canada, Sep. 14, 2010, 12 pages.
Computer Network Graph—Bees, http://bioteams.com/2007/04/30/visualizing_complex_networks.html, date accessed Sep. 28, 2016, 2 pages.
Computer Network Graph—Univ. of Michigan, http://people.cst.cmich.edu/liao1q/research.shtml, date accessed Sep. 28, 2016, 5 pagse.
Crowther, Kenneth G., et al., "Principles for Better Information Security through More Accurate, Transparent Risk Scoring," Journal of Homeland Security and Emergency Management, vol. 7, Issue 1, Article 37, 2010, 20 pages.
Davis, Lois M., et al., "The National Computer Security Survey (NCSS) Final Methodology," Technical report prepared for the Bureau of Justice Statistics, Safety and Justice Program, RAND Infrastructure, Safety and Environment (ISE), 2008, 91 pages.
Dillon-Merrill, PhD., Robin L, et al., "Logic Trees: Fault, Success, Attack, Event, Probability, and Decision Trees," Wiley Handbook of Science and Technology for Homeland Security, 13 pages.
The Dun & Bradstreet Corp. Stock Report, Standard & Poor's, Jun. 6, 2009, 8 pages.
Dun & Bradstreet, The DUNSRight Quality Process: Power Behind Quality Information, 24 pages.
Edmonds, Robert, "ISC Passive DNS Architecture", Internet Systems Consortium, Inc., Mar. 2012, 18 pages.
Equifax Inc. Stock Report, Standard & Poor's, Jun. 6, 2009, 8 pages.
Hacking Exposed 6, S. McClure et al., copyright 2009, 37 pages.
Ingols, Kyle, et al., "Modeling Modern Network Attacks and Countermeasures Using Attack Graphs," MIT Lincoln Laboratory, 16 pages.
Ingols, Kyle, et al., "Practical Attack Graph Generation for Network Defense," MIT Lincoln Library, IEEE Computer Society, Proceedings of the 22nd Annual Computer Security Applications Conference (ACSAC'06), 2006, 10 pages.
Ingols, Kyle, et al., "Practical Experiences Using SCAP to Aggregate CND Data," MIT Lincoln Library, Presentation to NIST SCAP Conference, Sep. 24, 2008, 59 pages.
Johnson, Eric, et al., "Information Risk and the Evolution of the Security Rating Industry," Mar. 24, 2009, 27 pages.
Lippmann, RP., et al., "An Annotated Review of Papers on Attack Graphs," Project Report IA-1, Lincoln Laboratory, Massachusetts Institute of Technology, Mar. 31, 2005, 39 pages.
Lippmann, RP., et al., "Evaluating and Strengthening Enterprise Network Security Using Attack Graphs," Project Report IA-2, MIT Lincoln Laboratory, Oct. 5, 2005, 96 pages.
Lippmann, Rich, et al., NetSPA: a Network Security Planning Architecture, MIT Lincoln Laboratory, 11 pages.
Lippmann, Richard, et al., "Validating and Restoring Defense in Depth Using Attack Graphs," MIT Lincoln Laboratory, 10 pages.
MaxMind, https://www.maxmind.com/en/about-maxmind, https://www.maxmind.com/en/geoip2-isp-database, date accessed Sep. 28, 20116, 3 pages.
Method Documentation, CNSS Risk Assessment Tool Version 1.1, Mar. 31, 2009, 24 pages.
Netcraft, www.netcraft.com, date accessed Sep. 28, 2016, 2 pages.
NetScanTools Pro, http://www.netscantools.com/nstpromain.html, date accessed Sep. 28, 2016, 2 pages.
Network Security Assessment, C. McNab, copyright 2004, 13 pages.
Nye, John, "Avoiding Audit Overlap," Moody's Risk Services, Presentation, Source Boston, Mar. 14, 2008, 19 pages.
Paxson, Vern, "How the Pursuit of Truth Led Me to Selling Viagra," EECS Department, University of California, International Computer Science Institute, Lawrence Berkeley National Laboratory, Aug. 13, 2009, 68 pages.
Proposal and Award Policies and Procedures Guide, Part I—Proposal Preparation & Submission Guidelines GPG, The National Science Foundation, Feb. 2009, 68 pages.
Rare Events, Oct. 2009, Jason, The MITRE Corporation, Oct. 2009, 104 pages.
Report to the Congress on Credit Scoring and Its Effects on the Availability and Affordability of Credit, Board of Governors of the Federal Reserve System, Aug. 2007, 304 pages.
RFC 781, https://tools.ietf.org/html/rfc781, date accessed Sep. 28, 2016, 3 pages.
RFC 950, https://tools.ietf.org/html/rfc950, date accessed Sep. 28, 2016, 19 pages.
RFC 954, https://tools.ietf.org/html/rfc954, date accessed Sep. 28, 2016, 5 pages.
RFC 1834, https://tools.ietf.org/html/rfc1834, date accessed Sep. 28, 2016, 7 pages.
SamSpade Network Inquiry Utility, https://www.sans.org/reading-room/whitepapers/tools/sam-spade-934, date accessed Sep. 28, 2016, 19 pages.
SBIR Phase 1: Enterprise Cyber Security Scoring, CyberAnalytix, LLC, http://www.nsf.gov/awardsearch/showAward.do?AwardNumber=I013603 Apr. 28, 2010, 2 pages.
Security Warrior, Cyrus Peikari, Anton, Chapter 8: Reconnaissance, 6 pages.
Snort Intrusion Monitoring System, http://archive.oreilly.com/pub/h/1393, date accessed Sep. 28, 2016, 3 pages.
Stone-Gross, Brett, et al., "FIRE: Finding Rogue Networks," 10 pages.
Taleb, Nassim N., et al., "The Six Mistakes Executives Make in Risk Management," Harvard Business Review, Oct. 2009, 5 pages.
The CIS Security Metrics vI.0.0, The Center for Internet Security, May 11, 2009, 90 pages.
The Fair Credit Reporting Act (FCRA) of the Federal Trade Commission (FTC), Jul. 30, 2004, 86 pages.
The Financial Institution Shared Assessments Program, Industry Positioning and Mapping Document, BITS, Oct. 2007, 44 pages.
Wikipedia, https://en.wikipedia.org/wiki/Crowdsourcing, date accessed Sep. 28, 2016, 25 pages.
Williams, Leevar, et al., "GARNET: A Graphical Attack Graph and Reachability Network Evaluation Tool," MIT Lincoln Library, VizSEC 2009, pp. 44-59.
Williams, Leevar, et al., "An Interactive Attack Graph Cascade and Reachability Display," MIT Lincoln Laboratory, 17 pages.

(56) References Cited

OTHER PUBLICATIONS

BitSight, "Cyber Security Myths Versus Reality: How Optimism Bias Contributes to Inaccurate Perceptions of Risk", Jun. 2015, Dimensional Research, pp. 1-9.
U.S. Appl. No. 13/240,572 as of Oct. 7, 2015, application as filed and pending claims, 45 pages.
U.S. Appl. No. 61/386,156 as of Oct. 7, 2015. 2 pages.
U.S. Appl. No. 13/240,572 and pending claims as of Mar. 22, 2016, 10 pages.
U.S. Appl. No. 14/944,484 and pending claims as of Mar. 22, 2016, 4 pages.
Provos et al., "The Ghost in the Browser Analysis of Web-based Malware", 2007 (9 pages).
Li et al., "Finding the Linchpins of the Dark Web: a Study on Topologically Dedicated Hosts on Malicious Web Infrastructures", IEEE, 2013 (15 pages).
Bhilare et al., "Protecting Intellectual Property and Sensitive Information in Academic Campuses from Trusted Insiders: Leveraging Active Directory", SIGUCC, Oct. 2009 (5 pages).
Jin et al, "Identifying and tracking suspicious activities through IP gray space analysis", MineNet, Jun. 12, 2007 (6 pages).
Chuvakin, "SIEM: Moving beyond compliance", RSA White Paper (2010) (16 pages).
U.S. Appl. No. 14/021,585 as of Oct. 7, 2015 and application as filed, 70 pages.
U.S. Appl. No. 14/021,585, as of Apr. 29, 2016, 2 pages.
Application as filed and pending claims for U.S. Appl. No. 13/240,572 as of Apr. 29, 2016, 46 pages.
Application as filed and pending claims for U.S. Appl. No. 14/944,484 as of Apr. 29, 2016, 4 pages.
U.S. Appl. No. 14/021,585 and pending claims as of Mar. 22, 2016, 2 pages.
U.S. Appl. No. 14/021,585, as of Nov. 18, 2015, 6 pages.
Application as filed, U.S. Appl. No. 13/240,572 as of Nov. 18, 2015, 45 pages.
Hachem, Sara; Toninelli, Alessandra; Pathak, Animesh; Issany, Valerie. Policy-Based Access Control in Mobile Social Ecosystems. 2011 IEEE International Symposium on Policies for Distributed Systems and Networks (POLICY). Http://ieeexplore.ieee.org/stamp/stamp.jsp?arnumber=5976796. 8 pages.
Srivastava, Divesh; Velegrakis, Yannis. Using Queries to Associate Metadata with Data. IEEE 23rd International Conference on Data Engineering. Pub. Date: 2007. http://ieeexplore.ieee.org/stamp/stamp.jsp?arnumber=4221823, 3 pages.
Gephi (gephi.org), accessed on the internet at https://web.archive.org/web/20151216223216/https://gephi.org/; Dec. 16, 2015; 1 page.
Mile 2 CPTE Maltego Demo, accessed on the internet at https://www.youtube.com/watch?v=o2oNKOUzPOU; Jul. 12, 2012; 1 page.
"Neo4j (neo4j.com)," accessed on the internet at https://web.archive.org/web/20151220150341/http://neo4j.com:80/developer/guide-data-visualization/; Dec. 20, 2015; 1 page.
"Creating Transparency with Palantir," accessed on the internet at https://www.youtube.com/watch?v=8cbGChfagUA; Jul. 5, 2012; 1 page.
"Palantir Cyber: Uncovering malicious behavior at petabyte scale," accessed on the internet at https://www.youtube.com/watch?v=EhYezV06EE; Dec. 21, 2012; 1 page.
Borgatti, et al., "On Social Network Analysis in a Supply Chain Context," Journal of Supply Chain Management; 45(2): 5-22; Apr. 2009, 18 pages.
Carstens, et al., "Modeling Company Risk and Importance in Supply Graphs," European Semantic Web Conference 2017: The Semantic Web pp. 18-31.
Gundert, Levi, "Big Data in Security—Part III: Graph Analytics," accessed on the Internet at https://blogs.cisco.com/security/big-data-in-security-part-iii-graph-analytics; Cisco Blog, Dec. 2013, 8 pages.
Jean, "Cyber Security: How to use graphs to do an attack analysis," accessed on the internet at https://linkurio.us/blog/cyber-security-use-graphs-attack-analysis/; Aug. 2014, 11 pages.
"Palantir.com," accessed on the internet at http://www.palantir.com/; Dec. 2015; 2 pages.
KC Claffy, "Internet measurement and data analysis: topology, workload, performance and routing statistics," accessed on the Internet at http://www.caida.org/publications/papers/1999/Nae/Nae.html., NAE '99 workshop, 1999, 22 pages.
"Maltego XL," accessed on the Internet at https://www.paterva.com/web7/buy/maltegoclients/maltego-xl.php, 5 pages.
Massimo Candela, "Real-time BGP Visualisation with BGPlay," accessed on the Internet at https://labs.ripe.net/Members/massimo_candela/real-time-bgp-visualisationwith-bgplay), Sep. 30, 2015, 8 pages.
Noel, et al., "Big-Data Architecture for Cyber Attack Graphs, Representing Security Relationships in NoSQL Graph Databases," The MITRE Corporation, 2014, 6 pages.
Wagner, et al., "Assessing the vulnerability of supply chains using graph theory," Int. J. Production Economics 126 (2010) 121-129.
Moradi, et al., "Quantitative Models for Supply Chain Management," IGI Global, 2012, 29 pages.
Joslyn, et al., "Massive Scale Cyber Traffic Analysis: A Driver for Graph Database Research," Proceedings of the First International Workshop on Graph Data Management Experience and Systems (GRADES 2013), 6 pages.
"About Neo4j," 1 page.
"Amazon Mechanical Turk," accessed on the internet at https://www.mturk.com/; 7 pages.
"Rapid7 Nexpose Vulnerability Scanner," accessed on the internet at http://www.rapid7.com/products/nexgose/download/, 3 pages.
"Tenable Nessus Network Vulnerability Scanner," accessed on the internet at https://www.tenable.com/products/nessus/nessus-professional; 13 pages.
"Computer Network Graph," http://www.opte.org; 1 page.
McNab, "Network Security Assessment," copyright 2004, 56 pages.
Gilgur, et al., "Percentile-Based Approach to Forecasting Workload Growth" Proceedings of CMG'15 Performance and Capacity International Conference by the Computer Measurement Group. No. 2015 (Year: 2015).
Seneviratne et al., "SSIDs in the Wild: Extracting Semantic Information from WiFi SSIDs" HAL archives-ouvertes.fr, HAL Id: hal-01181254, Jul. 29, 2015, 5 pages.
Search Query Report form IP.com (performed Apr. 27, 2020), 5 pages.
Camelo et al., "CONDENSER: A Graph-Based Approach for Detecting Botnets," AnubisNetworks R&D, Amadora, Portugal, 8 pages.
Camelo, "Botnet Cluster Identification," Sep. 2014, 2 pages.
U.S. Appl. No. 15/271,655 Published as: US2018/0083999, Self-Published Security Risk Management, filed Sep. 21, 2016.
U.S. Appl. No. 15/377,574 U.S. Pat. No. 9,705,932, Methods and Systems for Creating, De-Duplicating, and Accessing Data Using an Object Storage System, filed Dec. 13, 2016.
U.S. Appl. No. 14/021,585 U.S. Pat. No. 9,438,615 Published as: US2015/0074579, Security Risk Management, filed Sep. 9, 2013.
U.S. Appl. No. 15/216,955 Published as: US2016/0330231, Methods for Using Organizational Behavior for Risk Ratings, filed Jul. 22, 2016.
U.S. Appl. No. 15/239,063 Published as: US2017/0093901, Security Risk Management, filed Aug. 17, 2016.
U.S. Appl. No. 16/405,121 Published as: US2019/0260791, Methods for Using Organizational Behavior for Risk Ratings, filed May 7, 2019.
U.S. Appl. No. 13/240,572 Published as: US2016/0205126, Information Technology Security Assessment System, filed Sep. 22, 2011.
U.S. Appl. No. 14/944,484 U.S. Pat. No. 9,973,524 Published as: US2016/0323308, Information Technology Security Assessment System, filed Nov. 18, 2015.
U.S. Appl. No. 15/142,677 U.S. Pat. No. 9,830,569 Published as: US/2016/0239772, Security Assessment Using Service Provider Digital Asset Information, filed Apr. 29, 2016.
U.S. Appl. No. 15/134,845 U.S. Pat. No. 9,680,858, Annotation Platform for a Security Risk System, filed Apr. 21, 2016.

(56) References Cited

OTHER PUBLICATIONS

U.S. Appl. No. 15/044,952 Published as: US2017/0236077, Relationships Among Technology Assets and Services and the Entities Responsible for Them, filed Feb. 16, 2016.
U.S. Appl. No. 15/089,375 U.S. Pat. No. 10,176,445 Published as: US2017/0236079, Relationships Among Technology Assets and Services and the Entities Responsible for Them, filed Apr. 1, 2016.
U.S. Appl. No. 29/598,298 U.S. Pat. No. D. 835,631, Computer Display Screen With Graphical User Interface, filed Mar. 24, 2017.
U.S. Appl. No. 29/598,299 U.S. Pat. No. D. 818,475, Computer Display With Security Ratings Graphical User Interface, filed Mar. 24, 2017.
U.S. Appl. No. 29/599,622, Computer Display With Security Ratings Graphical User Interface, filed Apr. 5, 2017.
U.S. Appl. No. 29/599,620, Computer Display With Security Ratings Graphical User Interface, filed Apr. 5, 2017.
U.S. Appl. No. 16/015,686, Methods for Mapping IP Addresses and Domains to Organizations Using User Activity Data, file Jun. 22, 2018.
U.S. Appl. No. 16/543,075, Methods for Mapping IP Addresses and Domains to Organizations Using User Activity Data, filed Aug. 16, 2019.
U.S. Appl. No. 16/738,825, Methods for Mapping IP Addresses and Domains to Organizations Using User Activity Data, filed Jan. 9, 2020.
U.S. Appl. No. 15/918,286, Correlated Risk in Cybersecurity, filed Mar. 12, 2018.
U.S. Appl. No. 16/292,956, Correlated Risk in Cybersecurity, filed May 5, 2019.
U.S. Appl. No. 16/795,056, Correlated Risk in Cybersecurity, filed Feb. 19, 2020.
U.S. Appl. No. 16/170,680, Systems and Methods for Remote Detection of Software Through Browser Webinjects, filed Oct. 25, 2018.
U.S. Appl. No. 16/688,647, Systems and Methods for Remote Detection of Software Through Browser Webinjects, filed Nov. 19, 2019.
U.S. Appl. No. 15/954,921, Systems and Methods for External Detection of Misconfigured Systems, filed Apr. 17, 2018.
U.S. Appl. No. 16/549,764, Systems and Methods for Inferring Entity Relationships Via Network Communications of Users or User Devices, filed Aug. 23, 2019.
U.S. Appl. No. 16/583,991, Systems and Methods for Network Asset Dicovery and Association Thereof With Entitites, filed Sep. 26, 2019.
U.S. Appl. No. 29/666,942, Computer Display With Graphical User Interface, filed Oct. 17, 2018.
U.S. Appl. No. 16/360,641, Systems and Methods for Forecasting Cybersecurity Ratings Based on Event-Rate Scenarios, filed Mar. 21, 2019.
U.S. Appl. No. 16/514,771, Systems and Methods for Generating Security Improvement Plans for Entities, filed Jul. 17, 2019.
U.S. Appl. No. 16/922,273, Systems and Methods for Generating Security Improvement Plans for Entities, filed Jul. 7, 2020.
U.S. Appl. No. 29/677,306, Computer Display With Corporate Hierarchy Graphical User Interface Computer Display With Corporate Hierarchy Graphical User Interface, filed Jan. 18, 2019.
U.S. Appl. No. 16/775,840, Systems and Methods for Assessing Cybersecurity State of Entities Based on Computer Network Characterization, filed Jan. 29, 2020.
U.S. Appl. No. 16/779,437, Systems and Methods for Rapidly Generating Security Ratings, filed Jan. 31, 2020.
U.S. Appl. No. 16/802,232, Systems and Methods for Improving a Security Profile of an Entity Based on Peer Security Profiles, filed Feb. 26, 2020.
U.S. Appl. No. 16/942,452, Systems and Methods for Improving a Security Profile of an Entity Based on Peer Security Profiles, filed Jul. 29, 2020.
U.S. Appl. No. 29/725,724, Computer Display With Risk Vectors Graphical User Interface, filed Feb. 26, 2020.
U.S. Appl. No. 29/736,641, Computer Display With Peer Analytics Graphical User Interface, filed Jun. 2, 2020.
U.S. Appl. No. 15/271,655, the Office Actions dated Feb. 21, 2017 and Aug. 18, 2017.
U.S. Appl. No. 15/377,574, now U.S. Pat. No. 9,705,932, the Office Action dated Mar. 2, 2017 and the Notice of Allowance dated Jun. 1, 2017.
U.S. Appl. No. 14/021,585, now U.S. Pat. No. 9,438,615, the Office Action dated Mar. 11, 2016 and the Notice of Allowance dated Aug. 9, 2016.
U.S. Appl. No. 15/216,955, now U.S. Pat. No. 10,326,786, the Office Actions dated Nov. 4, 2016, Mar. 9, 2017, Jun. 6, 2017, Dec. 5, 2017, and Aug. 29, 2018, and the Notice of Allowance dated Feb. 6, 2019.
U.S. Appl. No. 15/239,063, now U.S. Pat. No. 10,341,370, the Office Action dated Mar. 21, 2018 and the Notice of Allowance dated Jan. 14, 2019.
U.S. Appl. No. 16/405,121, the Office Action dated Aug. 1, 2019 and Nov. 21, 2019, and the Notice of Allowance dated Jul. 10, 2020.
U.S. Appl. No. 13/240,572, the Office Actions dated Nov. 21, 2013, Jun. 16, 2014, Feb. 27, 2015, Jun. 3, 2015, Oct. 26, 2015, Mar. 10, 2016, Feb. 13, 2017; and the Notice of Allowance dated Jun. 1, 2020.
U.S. Appl. No. 14/944,484, now U.S. Pat. No. 9,973,524, the Office Actions dated Mar. 11, 2016, Jul. 5, 2016, and Jan. 17, 2017 and the Notice of Allowance dated Oct. 20, 2017.
U.S. Appl. No. 15/142,677, now U.S. Pat. No. 9,830,569, the Office Actions dated Jul. 26, 2016, and Apr. 24, 2017 and the Notice of Allowance dated Oct. 11, 2017.
U.S. Appl. No. 15/134,845, now U.S. Pat. No. 9,680,858, the Office Actions dated Jul. 19, 2016 and Jan. 26, 2017, and the Notices of Allowance dated Apr. 27, 2017 and May 9, 2017.
U.S. Appl. No. 15/044,952, the Office Actions dated Jul. 8, 2019 and Feb. 21, 2020.
U.S. Appl. No. 15/089,375, now U.S. Pat. No. 10,176,445, the Office Actions dated Sep. 9, 2016, May 17, 2017, and Nov. 17, 2017 and the Notice of Allowance dated Aug. 9, 2018.
U.S. Appl. No. 29/598,298, now U.S. Pat. No. D. 835,631, the Notice of Allowance dated Aug. 15, 2018.
U.S. Appl. No. 29/598,299, now U.S. Pat. No. D. 818,475, the Notice of Allowance dated Jan. 2, 2018.
U.S. Appl. No. 29/599,622, now U.S. Pat. No. D. 847,169, the Notice of Allowance dated Dec. 11, 2018.
U.S. Appl. No. 29/599,620, now U.S. Pat. No. D. 846,562, the Office Action dated May 3, 2018, the Notice of Allowance dated Nov. 27, 2018.
U.S. Appl. No. 16/015,686, now U.S. Pat. No. 10,425,380, the Office Action dated Nov. 16, 2018 and the Notice of Allowance dated May 10, 2019.
U.S. Appl. No. 16/543,075, the Notice of Allowance dated Sep. 25, 2019.
U.S. Appl. No. 16/738,825, the Office Actions dated Jul. 8, 2019 and Feb. 21, 2020.
U.S. Appl. No. 15/918,286, now U.S. Pat. No. 10,257,219, the Office Action dated Aug. 7, 2018 and the Notice of Allowance dated Nov. 29, 2018.
U.S. Appl. No. 16/292,956, the Office Action dated Jul. 10, 2019 and the Notices of Allowance dated Jan. 8, 2020 and Jan. 27, 2020.
U.S. Appl. No. 16/795,056, the Office Action dated May 1, 2020.
U.S. Appl. No. 16/170,680, the Office Action dated Mar. 26, 2019; the Notices of Allowance dated Oct. 29, 2019 and Aug. 27, 2019.
U.S. Appl. No. 16/688,647, the Office Action dated Jan. 29, 2020; the Notice of Allowance dated May 12, 2020.
U.S. Appl. No. 15/954,921, the Office Actions dated Sep. 4, 2018, Jan. 3, 2019, Aug. 19, 2019, and Dec. 5, 2019; Advisory Action dated Mar. 3, 2020, and the Notice of Allowance dated Jul. 7, 2020.
U.S. Appl. No. 16/787,650, the Notice of Allowance dated Apr. 7, 2020.
U.S. Appl. No. 16/583,991, the Office Action dated Jan. 13, 2020.
U.S. Appl. No. 29/666,942, the Notice of Allowance dated Apr. 30, 2020.
U.S. Appl. No. 16/360,641, the Office Action dated Aug. 7, 2019 and Feb. 20, 2020.

(56) References Cited

OTHER PUBLICATIONS

U.S. Appl. No. 16/514,771, the Office Action dated Dec. 4, 2019; the Notice of Allowance dated Mar. 18, 2020.
U.S. Appl. No. 16/775,840, the Notice of Allowance dated May 19, 2020.
U.S. Appl. No. 16/802,232, the Notice of Allowance dated Apr. 24, 2020.

* cited by examiner

US 11,023,585 B1

SYSTEMS AND METHODS FOR MANAGING CYBERSECURITY ALERTS

TECHNICAL FIELD

The present disclosure generally relates to methods and systems for determining the extent to which certain affiliates of an organization should be monitored. Some embodiments described herein relate specifically to methods and systems for managing a quantity and/or frequency of alerts that are sent to the organization based on cybersecurity risks or threats presented by one or more of the organization's affiliates.

BACKGROUND

Businesses, corporations, or organizations more generally often outsource work to third parties. As a result, organizations are connected to numerous third party affiliates. These connections or relationships leave organizations vulnerable to the security implementations of these third party affiliates. In order to reliably monitor dozens, hundreds, or even thousands of third party affiliates, organizations must dedicate a large amount of resources to manage this task.

For organizations with a large quantity of third party affiliates, monitoring each and every affiliate proves difficult and expensive. Staff dedicated to such monitoring is generally capable of handling only a fraction of an organization's affiliates, and there is no guarantee that they can do so accurately. Typically, hired staff can only monitor a fraction of the affiliates, especially as the organization grows and expands its affiliate network. Hiring more staff to handle the ever expanding affiliate network of a growing organization generally does not provide enough speed and analysis to accurately monitor such affiliates.

Blindly monitoring affiliates can be an overburdensome task for an organization, and can often lead to false positives (e.g., triggering alarms or alerts when unnecessary) and/or false negatives (e.g., missing critical events that warrant further investigation). What is needed is a method and supporting systems to allow organizations to dynamically adjust cybersecurity event reporting thresholds across their network of affiliates.

SUMMARY

In general, the present disclosure relates to systems and methods for generating and sending alerts to a company, organization, individual, or other alert recipient when one or more affiliates of the alert recipient are associated with a high or unreasonable cybersecurity threat or risk. Cybersecurity data for an affiliate entity (or multiple affiliate entities) can be obtained and used to generate a cybersecurity rating for the affiliate entity, as described herein. Based on the value of the cybersecurity rating and/or on a rate at which the value is changing (e.g., a weekly drop rate), an alert can be sent to the alert recipient, to warn the alert recipient of a potential cybersecurity threat or risk associated with the affiliate entity. In some instances, however, the alert recipient may receive an inappropriate number or frequency of alerts. When the number or frequency of alerts is too high, for example, the alert recipient may become numb to the alerts, may stop taking the alerts seriously, and/or may become frustrated by repeated reminders. Alternatively, when the number or frequency of alerts is too low, the alert recipient may not take the alerts seriously, may fail to recognize a cybersecurity threat, and/or may not take appropriate corrective action.

Advantageously, the systems and methods described herein allow alert recipients to manage the number of automated alerts they receive based on cybersecurity ratings of one or more affiliate entities. The systems and methods allow an alert reporting threshold to be optimized, so that a comparison of the alert reporting threshold to a cybersecurity risk presented by an affiliate entity results in a desired number of alerts. In some instances, for example, a security rating time history (also referred to herein as a time-series cybersecurity rating) for an affiliate entity can be generated and compared with the alert reporting threshold, and the alert reporting threshold can be adjusted until a desired number of alerts for the time history is obtained, for example, using automated and/or iterative techniques. The resulting alert reporting threshold can be used to automatically generate and send future alerts (e.g., automated electronic messages) for the affiliate entity. In other words, the disclosed method provides solutions to problems in the software arts. Thus, the improved numerical methods and logical recommendations described herein constitute improvements to computer-related technology for reasons similar to those articulated by the Federal Circuit in Enfish, LLC v. Microsoft Corp, and are not abstract ideas.

In general, one innovative aspect of the subject matter described in the present disclosure can be embodied in a computer-implemented method of setting alert thresholds related to cybersecurity ratings of one or more affiliate entities. The method includes: obtaining entity data including a plurality of entity data sets, each entity data set associated with a respective affiliate entity from a plurality of affiliate entities and including cybersecurity event data associated with each respective affiliate entity; calculating a time-series cybersecurity rating for one or more of the affiliate entities based on the respective entity data set; associating an alert reporting threshold with the time-series cybersecurity rating, wherein a comparison of the alert reporting threshold to the time-series cybersecurity rating determines a number of alerts reported for the one or more affiliate entities; applying an alternative alert reporting threshold against the time-series cybersecurity rating to determine an alternative number of alerts reported for the one or more affiliate entities; and updating the alert reporting threshold for the time-series cybersecurity rating to the alternative alert reporting threshold.

In certain examples, the plurality of affiliate entities can include affiliates of an intended recipient of the alerts. The time-series cybersecurity rating can include a history of cybersecurity ratings during a previous time period. The alert reporting threshold can include a threshold cybersecurity rating. The alert reporting threshold can include a threshold rate of change in the time-series cybersecurity rating. Alerts can be generated periodically while the time-series cybersecurity rating is either above or below the alert reporting threshold. Applying an alternative alert reporting threshold can include iterating on the alert reporting threshold to achieve a desired number of alerts reported for the one or more affiliate entities during a previous time period. Iterating on the alert reporting threshold can include receiving a user-specified desired number of alerts. Applying an alternative alert reporting threshold can include iterating on the alert reporting threshold until a desired number of affiliate entities from the one or more affiliate entities trigger alerts during a previous time period. The method can include sending alerts to an intended recipient during a future time period using the updated alert reporting threshold.

In another aspect, the subject matter described in the present disclosure relates to a system having one or more computer systems programmed to perform operations including: obtaining entity data including a plurality of entity data sets, each entity data set associated with a respective affiliate entity from a plurality of affiliate entities and including cybersecurity event data associated with each respective affiliate entity; calculating a time-series cybersecurity rating for one or more of the affiliate entities based on the respective entity data set; associating an alert reporting threshold with the time-series cybersecurity rating, wherein a comparison of the alert reporting threshold to the time-series cybersecurity rating determines a number of alerts reported for the one or more affiliate entities; applying an alternative alert reporting threshold against the time-series cybersecurity rating to determine an alternative number of alerts reported for the one or more affiliate entities; and updating the alert reporting threshold for the time-series cybersecurity rating to the alternative alert reporting threshold.

In some implementations, the plurality of affiliate entities can include affiliates of an intended recipient of the alerts. The time-series cybersecurity rating can include a history of cybersecurity ratings during a previous time period. The alert reporting threshold can include a threshold cybersecurity rating. The alert reporting threshold can include a threshold rate of change in the time-series cybersecurity rating. Alerts can be generated periodically while the time-series cybersecurity rating is either above or below the alert reporting threshold. Applying an alternative alert reporting threshold can include iterating on the alert reporting threshold to achieve a desired number of alerts reported for the one or more affiliate entities during a previous time period. Iterating on the alert reporting threshold can include receiving a user-specified desired number of alerts. Applying an alternative alert reporting threshold can include iterating on the alert reporting threshold until a desired number of affiliate entities from the one or more affiliate entities trigger alerts during a previous time period. The operations can include sending alerts to an intended recipient during a future time period using the updated alert reporting threshold.

In another aspect, the subject matter described in the present disclosure relates to a non-transitory computer-readable medium having instructions stored thereon that, when executed by one or more computer processors, cause the one or more computer processors to perform operations including: obtaining entity data including a plurality of entity data sets, each entity data set associated with a respective affiliate entity from a plurality of affiliate entities and including cybersecurity event data associated with each respective affiliate entity; calculating a time-series cybersecurity rating for one or more of the affiliate entities based on the respective entity data set; associating an alert reporting threshold with the time-series cybersecurity rating, wherein a comparison of the alert reporting threshold to the time-series cybersecurity rating determines a number of alerts reported for the one or more affiliate entities; applying an alternative alert reporting threshold against the time-series cybersecurity rating to determine an alternative number of alerts reported for the one or more affiliate entities; and updating the alert reporting threshold for the time-series cybersecurity rating to the alternative alert reporting threshold.

Other embodiments of this aspect include corresponding systems, apparatus, and computer programs recorded on one or more computer storage devices, each configured to perform the actions of the method. A system of one or more computers can be configured to perform particular actions by virtue of having software, firmware, hardware, or a combination of them installed on the system (e.g., instructions stored in one or more storage devices) that in operation causes or cause the system to perform the actions. One or more computer programs can be configured to perform particular actions by virtue of including instructions that, when executed by data processing apparatus, cause the apparatus to perform the actions.

The details of one or more embodiments of the subject matter described in this specification are set forth in the accompanying drawings and the description below. Other features, aspects, and advantages of the subject matter will become apparent from the description, the drawings, and the claims.

The foregoing Summary, including the description of some embodiments, motivations therefor, and/or advantages thereof, is intended to assist the reader in understanding the present disclosure, and does not in any way limit the scope of any of the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DETAILED DESCRIPTION

Figure 1:
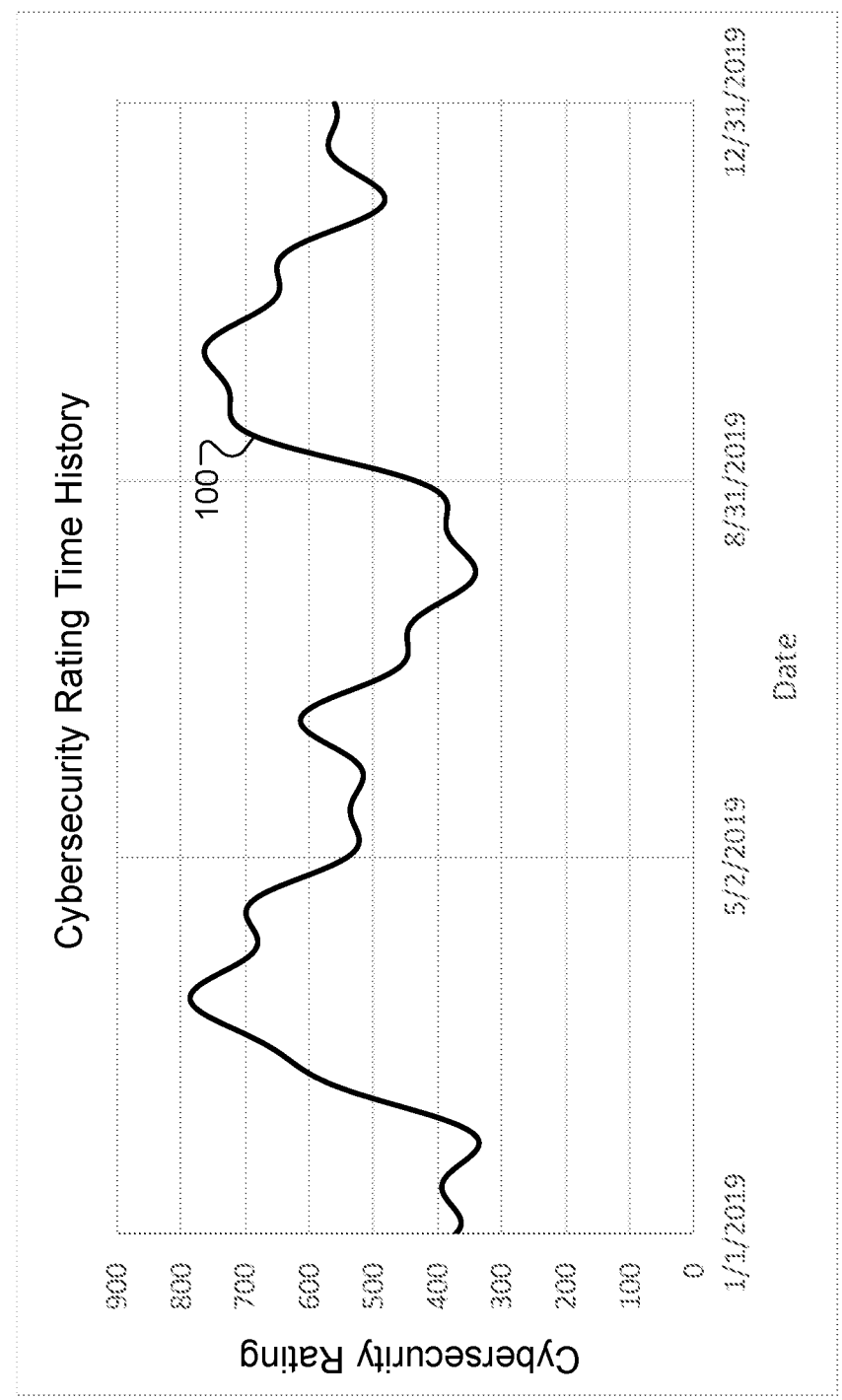
FIG. 1 is a plot of a cybersecurity rating time history, in accordance with certain embodiments.

As used herein, the term "affiliate" or "affiliate entity" may refer to a company, organization, individual, or other entity that interacts or otherwise conducts business with an alert recipient.

As used herein, "alert recipient" may refer to a company, organization, individual, or other entity that receives alerts corresponding to cybersecurity risks or threats associated with an affiliate or affiliate entity.

As used herein, the term "alert" may refer to a message or notification (e.g., a text message, email, phone call, or letter) sent to an alert recipient. An alert can be generated and sent to the alert recipient when the systems and methods described herein identify a cybersecurity threat or risk associated with an affiliate or affiliate entity.

As used herein, "time series" or "time-series" may refer to a series of parameter values in time order, but not necessarily values that are equally spaced in time. The parameter for the time series may be, for example, a cybersecurity rating or a rate of change (e.g., a weekly drop) in the cybersecurity rating. A time series may also be referred to herein as a "time history."

In various examples, a security profile of an affiliate entity can reflect the past, present, and/or future security characteristics of the affiliate entity. In some embodiments, the security profile may reflect security risks to which the affiliate entity is exposed balanced by countermeasures that the affiliate entity has taken or can take to mitigate the security risk. As referred to herein, a security profile of an affiliate entity can be or include a security rating (also referred to herein as a "cybersecurity rating") for the affiliate entity. A security rating may be quantitative or qualitative. For example, a quantitative security rating may be expressed as a number within a predetermined range (e.g., between 300 and 900, as provided by BitSight Technologies, Inc. of Boston, Mass., USA).

Examples of determining security ratings of affiliate entities can be found in at least U.S. Patent Application Publication No. 2016/0205126 published on Jul. 14, 2016 and titled "Information Technology Security Assessment System," U.S. Pat. No. 9,973,524 issued on May 15, 2018 and titled "Information Technology Security Assessment System," U.S. Pat. No. 9,830,569 issued on Nov. 28, 2017 and titled "Security Assessment Using Service Provider Digital Asset Information," and U.S. patent application Ser. No. 16/514,771 filed on Jul. 17, 2019 and titled "Systems and Methods for Generating Security Improvement Plans for Entities," each of which is incorporated herein by reference in its entirety. For example, a security rating can be generated by collecting information about an affiliate entity's computer system, e.g., information technology assets that the affiliate entity controls, uses, or is affiliated with. Examples of asset ownership include control and operation of an Internet Protocol (IP) network address range or computer services such as web servers residing within that address block. Information about affiliate entities also includes relationships such as subsidiaries, affiliates, etc., that describe affiliate entity association. External data can be collected and include multiple data types, such as breach disclosures, block lists, configuration parameters, malware servers, reputation metrics, suspicious activity, spyware, white lists, compromised hosts, malicious activity, spam activity, vulnerable hosts, phishing, user behavior, or email viruses. To determine the security rating for an affiliate entity, the system aggregates some or all of the collected data, which can be referred to herein as "entity data."

FIG. 1 is a plot of an example time-series security rating 100 for an affiliate entity during a time period corresponding to the year 2019. In general, the security rating 100 provides an indication of the cybersecurity risk, threats, and/or vulnerabilities associated with the affiliate entity. In examples described herein, a low security rating 100 is indicative of a high cybersecurity risk or threat, and a high security rating 100 is indicative of a low cybersecurity risk or threat. It is understood, however, that the opposite can be true for the security rating 100, such that a high security rating 100 can be associated with a high risk or threat, and a low security rating 100 can be associated with a low risk or threat. As the figure indicates, the security rating 100 can vary over time, for example, as new cybersecurity event data for the affiliate entity is collected and used to update the security rating 100.

In various examples, it is desirable to monitor the security rating 100 for the affiliate entity and send alerts to one or more alert recipients when the security rating 100 indicates the affiliate entity is associated with a high cybersecurity risk or threat. In such instances, for example, one or more automated alerts can be sent by email, text messaging, phone, and/or other messaging services to the alert recipients. Alternatively, when the cybersecurity risk or threat is low, there may be no need to send or report such alerts.

Figure 2:
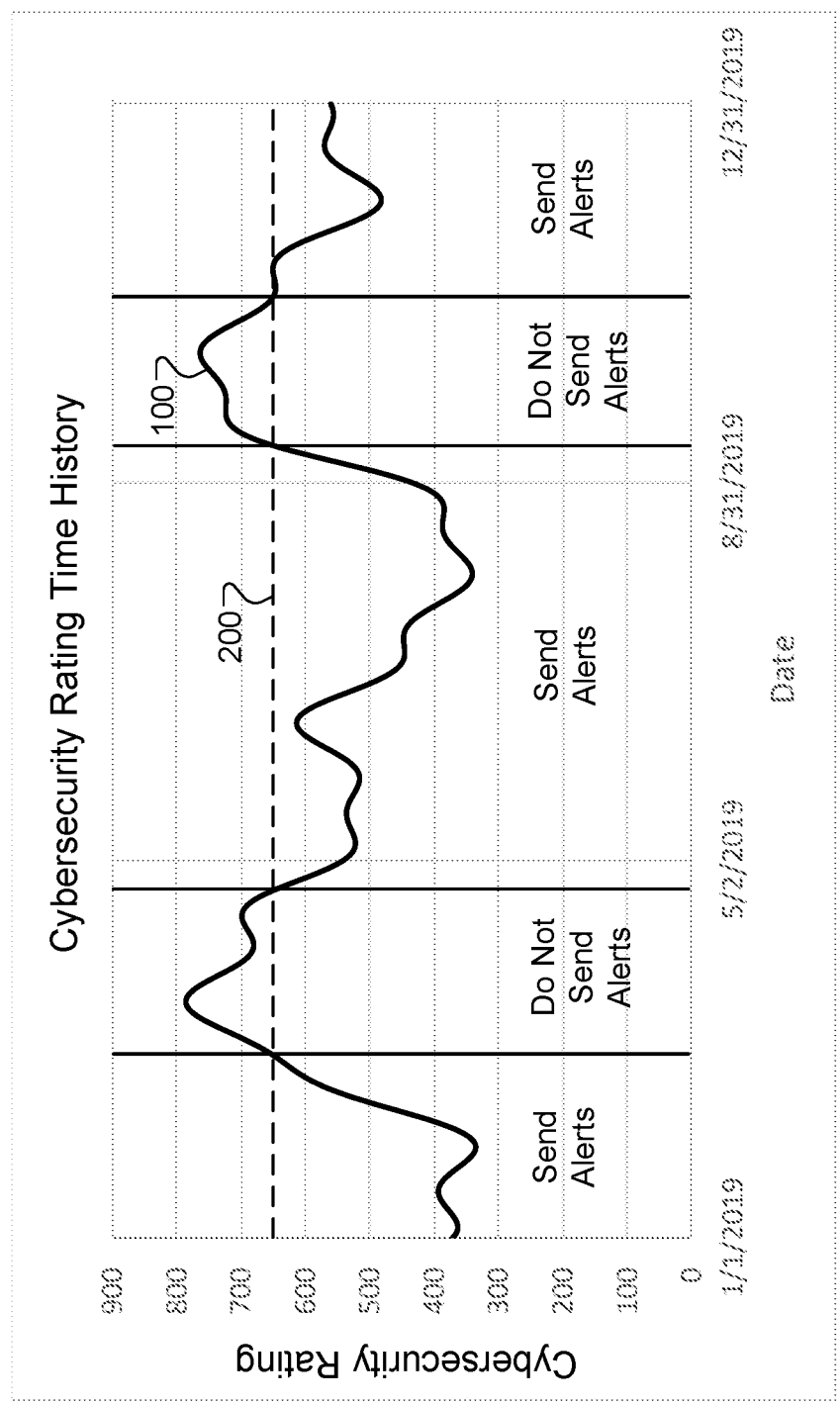
FIG. 2 is a plot of a cybersecurity rating time history and an alert reporting threshold, in accordance with certain embodiments.
Figure 3:
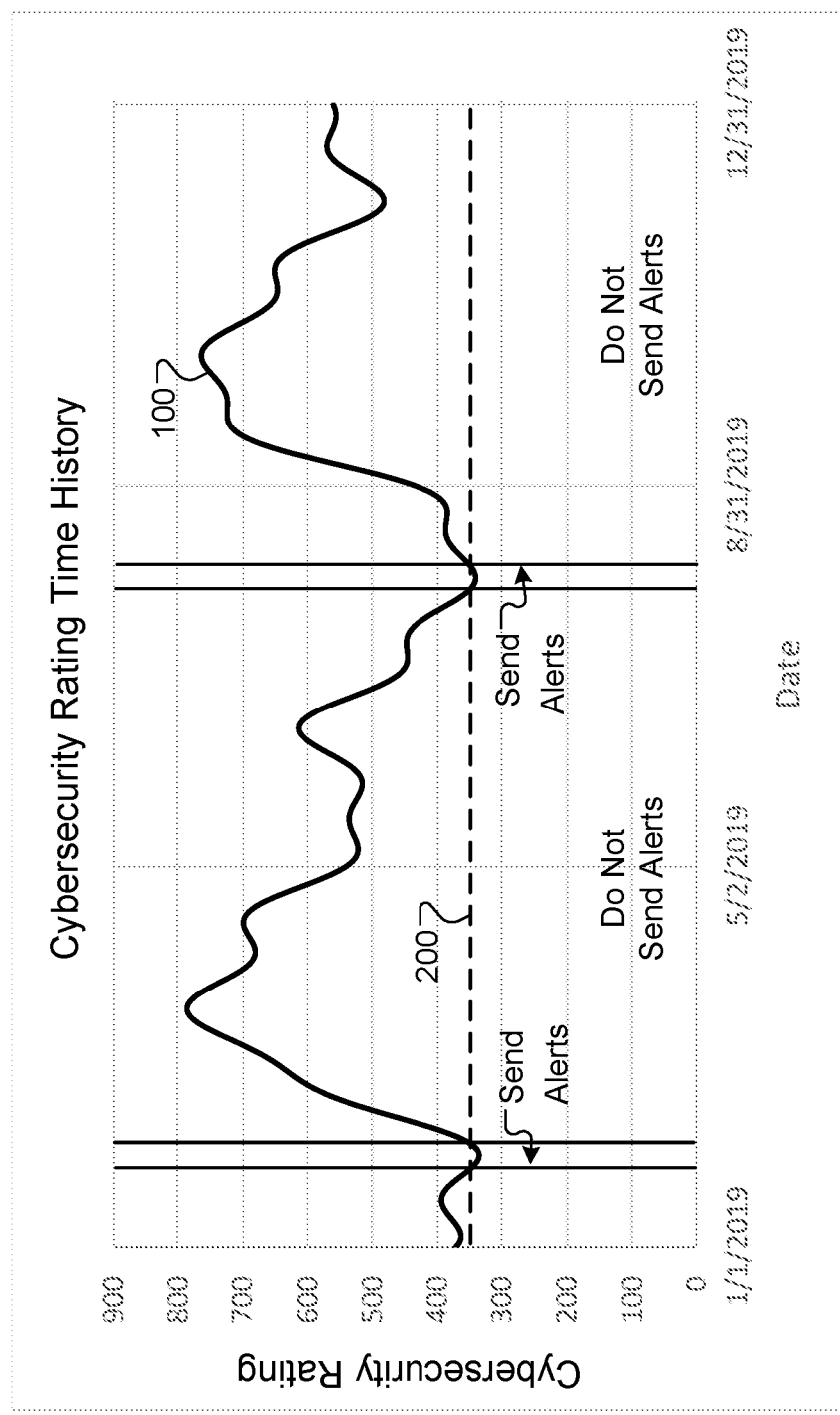
FIG. 3 is a plot of a cybersecurity rating time history and an alert reporting threshold, in accordance with certain embodiments.

Referring to FIG. 2, in some examples, an alert reporting threshold 200 can be used to trigger the sending of alerts based on the security rating 100. In the depicted example, the alert reporting threshold 200 has been set to 650, such that alerts are sent when the security rating 100 is below 650, and no alerts are sent when the security rating 100 is at or above 650. By comparison, FIG. 3 depicts an example in which the alert reporting threshold 200 has been set to 350. In this case, alerts are sent when the security rating 100 is below 350, and no alerts are sent when the security rating 100 is at or above 350. As the two figures indicate, a higher threshold 200 results in more instances when the security rating 100 is below the threshold 200, and this generally results in more opportunities for alerts to be sent. For example, if one alert is sent for each day that the security rating 100 is below the threshold 200, the example in FIG. 2 would result in a total of 261 alerts, and the example in FIG. 3 would result in a total of 17 alerts. Likewise, if one alert is sent for each hour that the security rating 100 is below the threshold 200, the example in FIG. 2 would result in a total of about 6300 alerts, and the example in FIG. 3 would result in a total of about 400 alerts. Accordingly, selection of the threshold 200 can have a significant influence on the number of alerts generated and sent to affiliated alert recipients.

In general, alerts can be sent periodically (e.g., hourly, daily, weekly, or monthly) during a time that the security rating 100 is below the threshold 200. In such instances, a frequency at which the alerts are sent can be constant (e.g., once per day). Alternatively or additionally, the frequency can vary over time and/or can be based on a difference between the threshold 200 and a current value of the security rating 100, with a larger difference resulting in a higher alert frequency. In certain examples, an alert can be sent each time the security rating 100 drops from being above the threshold 200 to being below the threshold 200.

In certain implementations, the systems and methods described herein can determine a total number or frequency of alerts that will be sent to an alert recipient based on cybersecurity risks or threats occurring across a portfolio or group of affiliate entities. For example, the systems and methods can determine a number or frequency of alerts that will be sent for each affiliate entity during one or more time periods (e.g., each week in 2019), based on a security rating for each affiliate entity. The systems and methods can then aggregate or sum the number or frequency of alerts for all the affiliate entities to obtain a total number of alerts or an overall alert frequency for the group of affiliate entities during the time periods.

Figure 4:
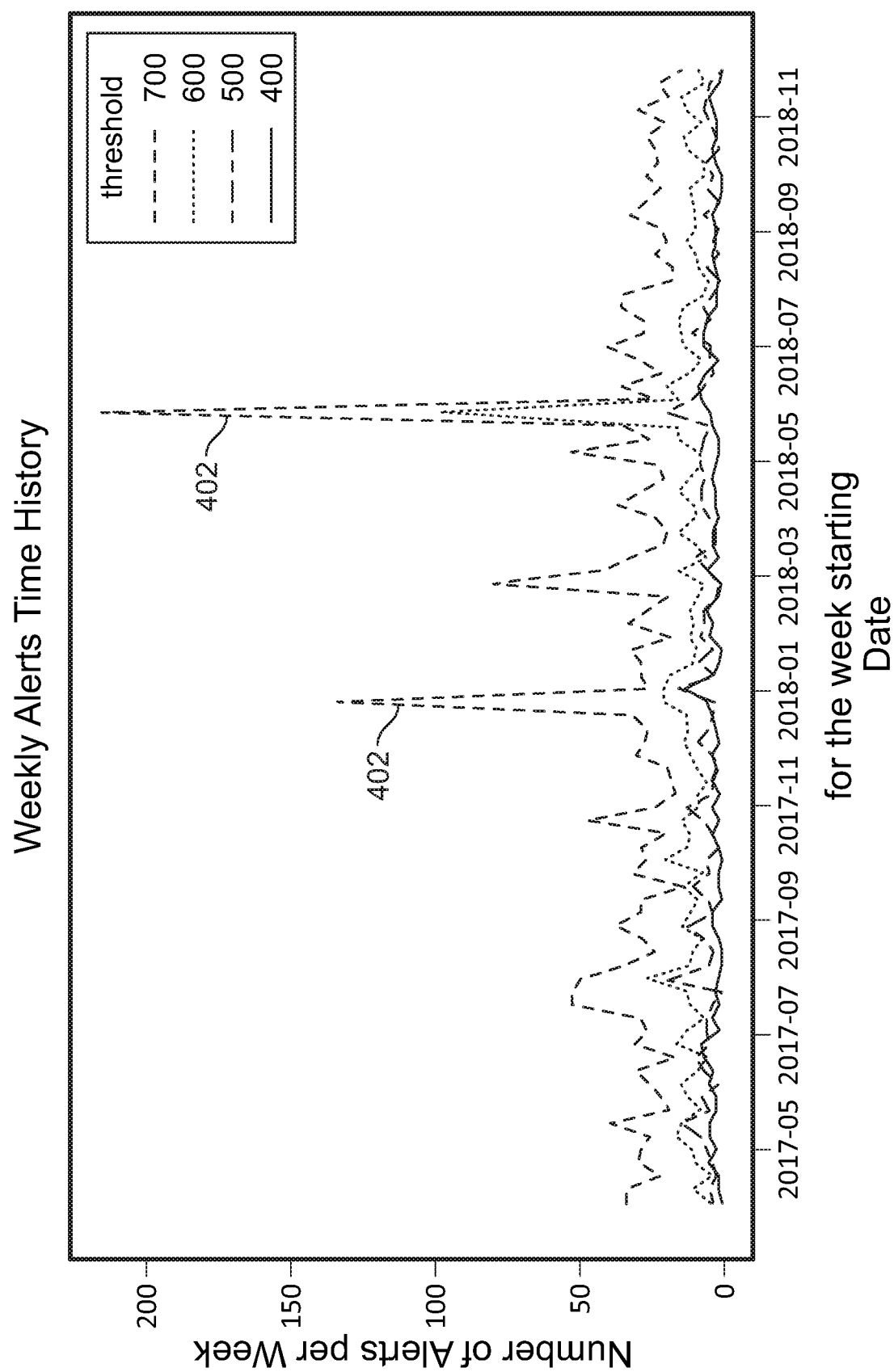
FIG. 4 is a plot of a number of cybersecurity alerts sent each week to an alert recipient over time, for various alert reporting thresholds, in accordance with certain embodiments.

For example, FIG. 4 is a time history of a total number of alerts sent to an alert recipient each week based on security ratings for a group of affiliate entities, for various values of the alert reporting threshold, during a time frame beginning around April 2017 and ending around December 2018. As the figure indicates, an alert threshold of 700 resulted in a total of about 25 alerts per week across all affiliate entities, on average, and a few instances 402 when more than 100 alerts per week were sent for all affiliate entities. By comparison, an alert threshold of 400 resulted in less than 5 alerts per week, on average.

Figure 5:
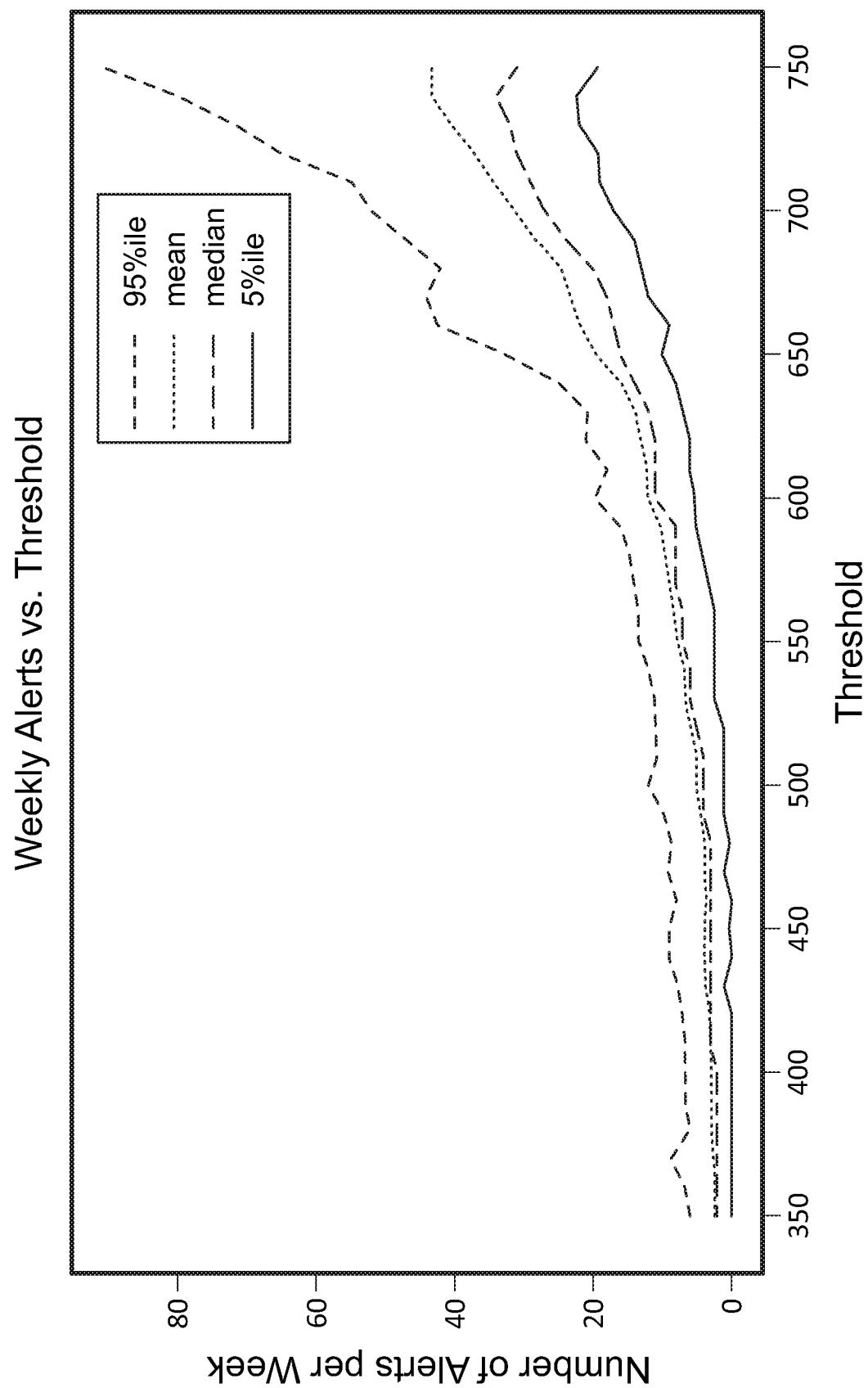
FIG. 5 is a plot of a number of weekly cybersecurity alerts versus an alert reporting threshold, in accordance with certain embodiments.

FIG. 5 is a plot of a total number of alerts per week versus the alert reporting threshold, for the same group of affiliate entities and same time frame presented in FIG. 4. As FIG. 5 indicates, the number of alerts generally increases as the alert reporting threshold increases.

In various examples, the systems and methods described herein can allow the alert reporting threshold to be adjusted, so that an optimal or desired number of alerts is generated for one or more affiliate entities, going forward. For example, the systems and methods can adjust the threshold and determine a number of alerts that would have been generated for a security rating during a previous time period, such as the year 2019. Referring again to FIGS. 2 and 3, for example, a user can adjust the threshold 200 for the security rating 100, and the systems and methods can calculate or recalculate a number of alerts that would have been generated for each value of the threshold 200. The calculated number of alerts can be, for example, the total number of alerts generated for 2019. Alternatively or additionally, the calculated number of alerts can be a rate of alert generation, such as a minimum, average, or maximum number of alerts per hour, day, week, or month, during 2019. With this approach, the user can adjust the threshold value (e.g., via trial and error) until a preferred threshold is identified that results in a desired number or frequency of alerts for the security rating 100. The user can then apply the preferred threshold to a future time period, such as the year 2020. For example, the user can set the alert reporting threshold for the affiliate entity (and/or other affiliate entities) to be equal to the preferred threshold, so that future alerts are generated according to the preferred threshold. Additionally or alternatively, in some examples, the alert reporting threshold can be applied across a group of affiliate entities and a total number or frequency of alerts can be determined, for all the affiliate entities during a time period (e.g., 2019). The alert reporting threshold can be varied until a desired number or frequency of alerts is sent for all the affiliate entities. The number or frequency of alerts can be determined daily, weekly, monthly, or for other discrete time periods.

In some instances, this approach of adjusting the threshold until a desired number or frequency of alerts is obtained for a previous time period can be performed automatically. For example, a user can specify a desired number or frequency of alerts, and the systems and methods can adjust the threshold (e.g., in an iterative manner) until a preferred threshold is identified that results in the desired number or frequency of alerts for that time period. The systems and methods can use an iterative technique such as, for example, Newton's method, the bisection method, and/or interpolation to find the preferred threshold. The systems and methods can choose an initial threshold and then automatically adjust the threshold until the desired number of alerts is obtained.

Figure 6:
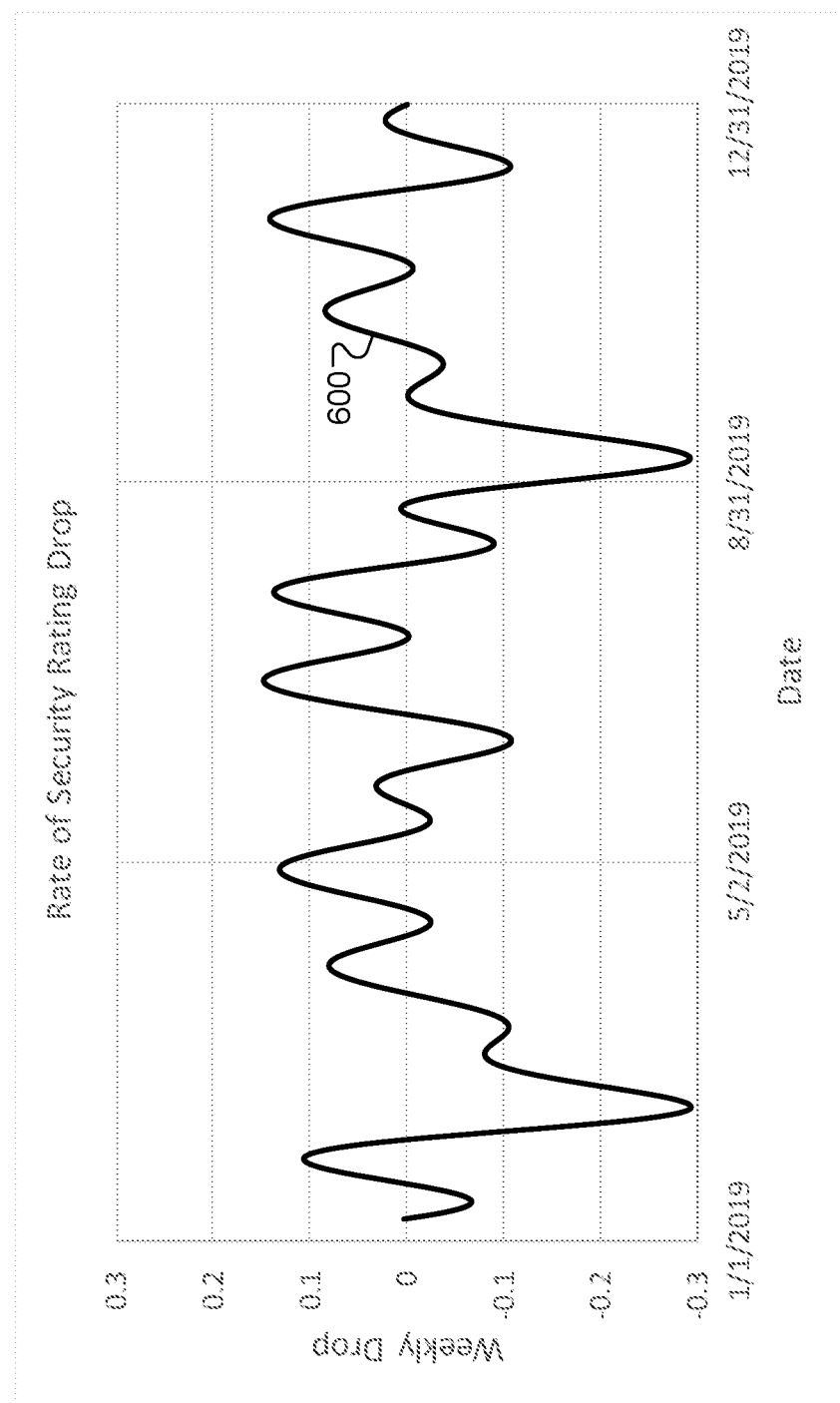
FIG. 6 is a plot of a weekly drop in a cybersecurity rating time history, in accordance with certain embodiments.

Alternatively or additionally, in some examples, alerts can be generated based on a rate at which the security rating is changing. For example, FIG. 6 is a plot of a time history of a weekly drop 600 in a security rating (e.g., the security rating 100) for the 2019 time period. In the depicted example, the weekly drop 600 represents a fractional drop in the security rating, which can be calculated as follows: Fractional Drop=(Initial Value−Current Value)/Initial Value, where the Current Value is the security rating on the current day, and the Initial Value is the security rating from one week (seven days) ago. The fractional drop can be calculated weekly (as shown in the figure, to obtain the weekly drop 600), hourly, daily, monthly, or for other time intervals. In general, when the weekly drop 600 is positive, the security rating is decreasing, and when the weekly drop is negative, the security rating is increasing. A high weekly drop can indicate the security rating is decreasing rapidly, which can be indicative of an increasing cybersecurity risk or threat. It can be desirable to send or report alerts to affiliated alert recipients during such instances. A threshold value can be used to trigger alerts based on the drop in security rating, such as the weekly drop 600, hourly drop, daily drop, or monthly drop.

Figure 7:
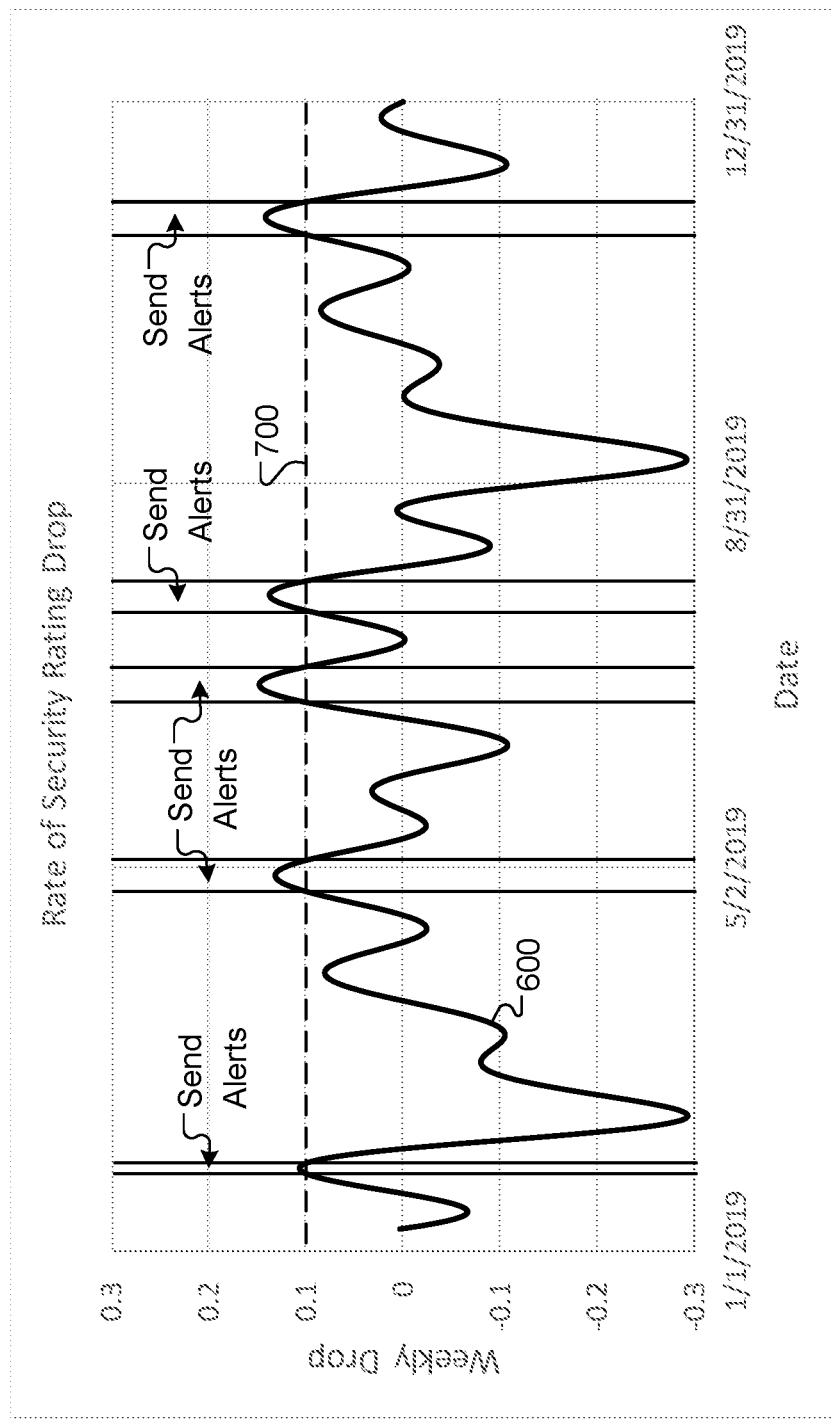
FIG. 7 is a plot of a weekly drop in a cybersecurity rating time history and an alert reporting threshold, in accordance with certain embodiments.

For example, FIG. 7 is a plot of the weekly drop 600 in which an alert reporting threshold 700 has been set to 0.1 (or 10%). As the figure indicates, when the weekly drop 600 is above the threshold 700, alerts may be sent. Otherwise, when the weekly drop 600 is below or equal to the threshold 700, no alerts may be sent. A higher value for the threshold 700 generally results in fewer alerts being generated and a lower value of the threshold 700 results in more alerts being generated. In various examples, alerts can be sent periodically (e.g., hourly, daily, weekly, or monthly) during a time when the weekly drop exceeds the threshold 700. In such instances, a frequency at which alerts are sent can be constant (e.g., once per day). Alternatively or additionally, the frequency can vary over time and/or can be based on a difference between the weekly drop 600 and the threshold 700, with a larger difference resulting in a higher alert frequency. In certain examples, an alert can be sent each time the weekly drop 600 transitions from being below the threshold 700 to being above the threshold 700.

Figure 8:
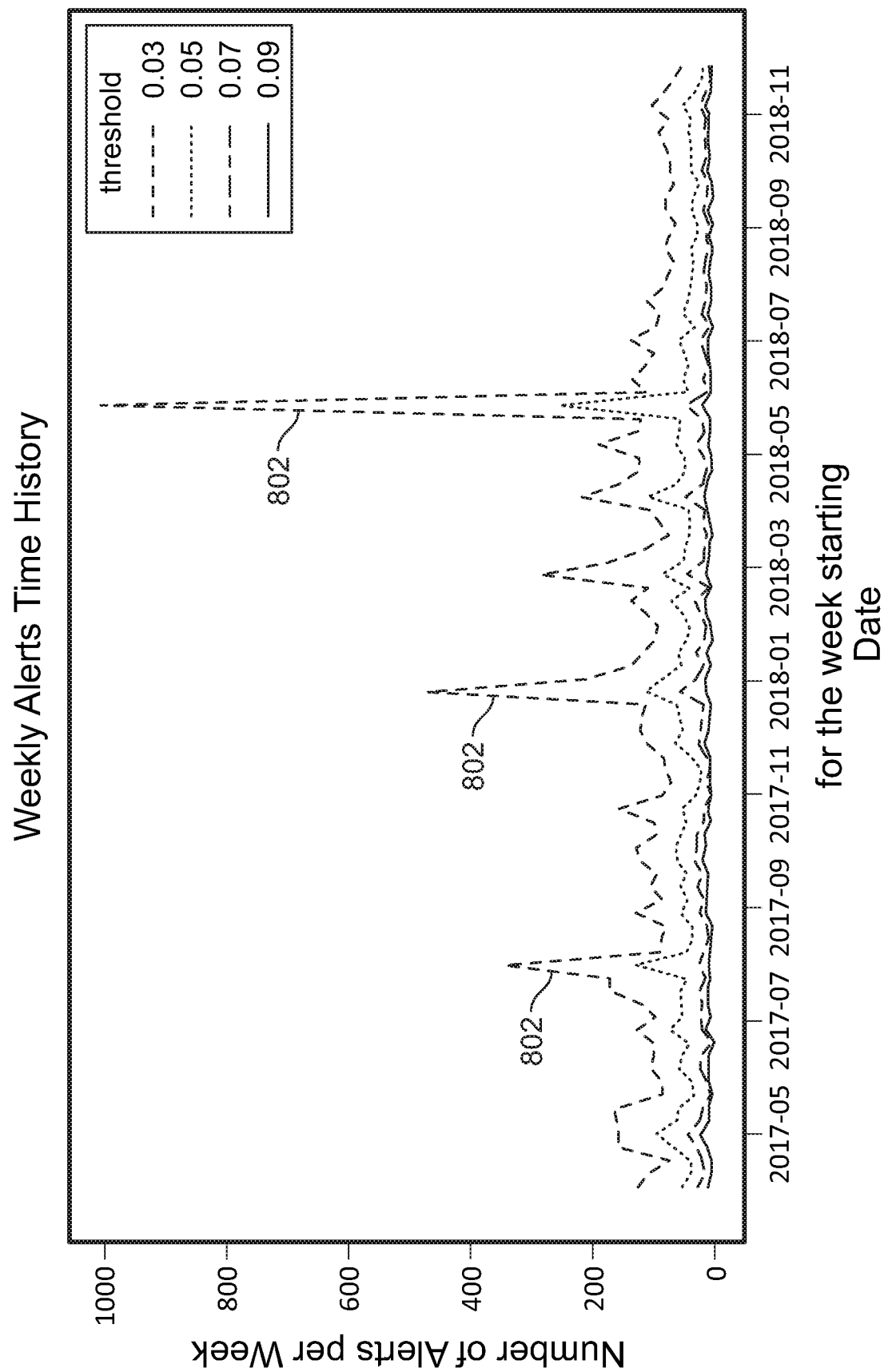
FIG. 8 is a plot of a number of cybersecurity alerts sent each week to an alert recipient over time, for various alert reporting thresholds, in accordance with certain embodiments.

FIG. 8 is a time history of a total number of alerts sent to an alert recipient each week based on weekly drop for a group of affiliate entities, for various values of the alert reporting threshold, during a time frame beginning around April 2017 and ending around December 2018. A threshold of 0.03 in this example resulted in about 100 alerts per week across all affiliate entities, on average, and a few instances 802 when more than 200 alerts per week were sent for all affiliate entities. By comparison, an alert threshold of 0.09 resulted in less than about 10 alerts per week, on average, with no large alert spikes.

Figure 9:
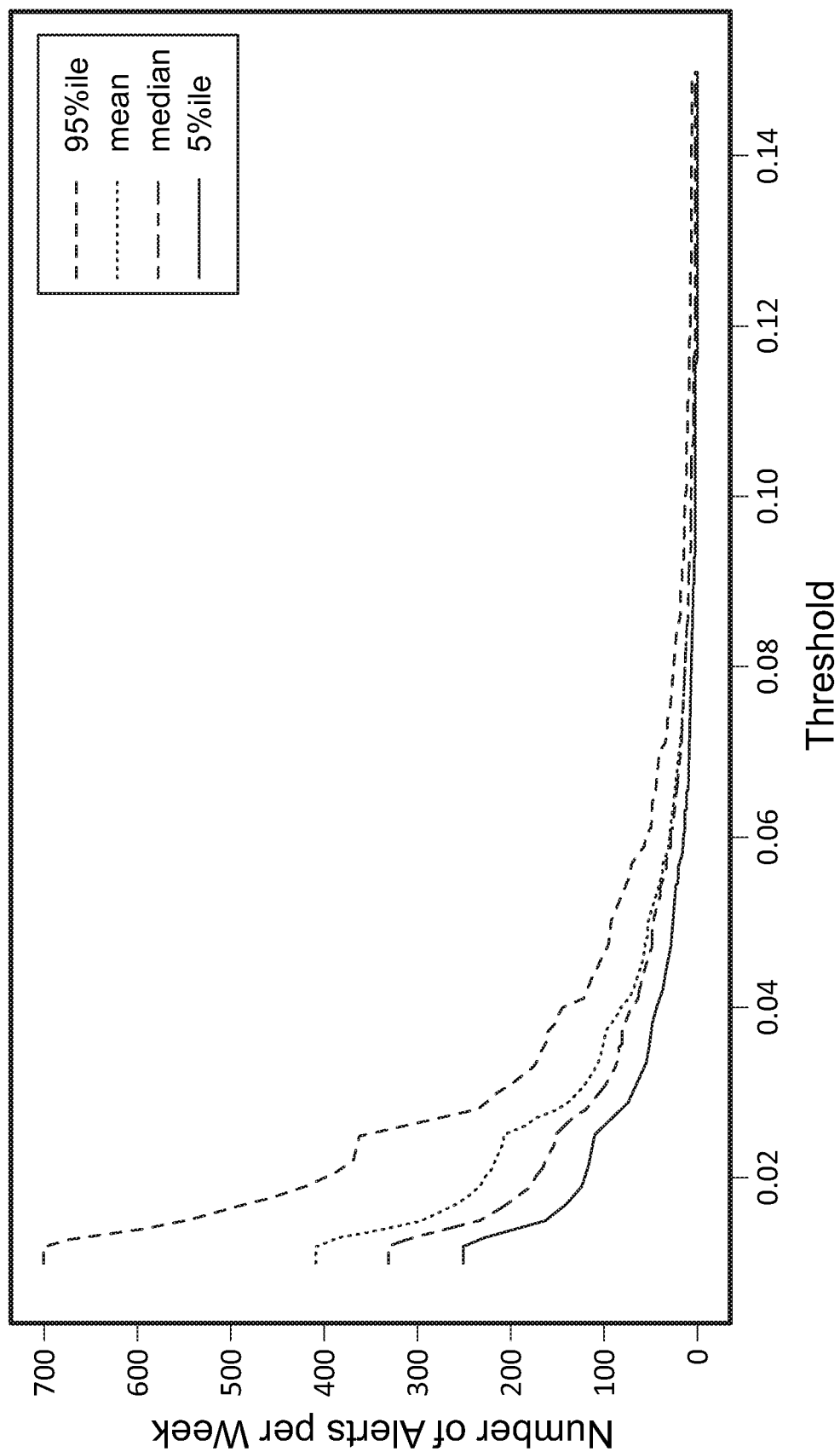
FIG. 9 is a plot of a number of weekly cybersecurity alerts versus an alert reporting threshold, in accordance with certain embodiments.

FIG. 9 is a plot of the number of alerts per week based on weekly drop versus the alert reporting threshold for the same group of affiliate entities and same time frame presented in FIG. 8. As FIG. 9 indicates, the number of alerts generally decreases as the alert reporting threshold increases.

In various examples, the systems and methods described herein can be used to adjust the alert reporting threshold, so that an optimal or desired number of alerts is generated based on weekly drop or other measure of security rating rate of change (e.g., daily drop or monthly drop). For example, the systems and methods can adjust the threshold and determine a number of alerts that would have been generated for a given weekly drop time history during a previous time period, such as the year 2019. Referring again to FIG. 7, for example, a user can adjust the threshold 700 for the weekly drop 600, and the systems and methods can calculate a number of alerts that would have been generated for each value of the threshold 700. The calculated number of alerts can be, for example, the total number of alerts generated for 2019. Alternatively or additionally, the calculated number of alerts can be a rate of alert generation, such as a minimum, average, or maximum number of alerts per hour, day, week, or month, during 2019. With this approach, the user can adjust the threshold value (e.g., via trial and error) until a preferred threshold is identified that results in a desired number or frequency of alerts for the security rating 100. The user can then apply the preferred threshold to a future time period, such as the year 2020. For example, the user can set the alert reporting threshold for the affiliate entity (and/or other affiliate entities) to be equal to the preferred threshold, so that future alerts are generated according to the preferred threshold.

In some instances, this approach of adjusting the threshold until a desired number or frequency of alerts is determined for a previous time period can be performed automatically. For example, a user can specify a desired number or frequency of alerts, and the systems and methods can adjust the threshold (e.g., in an iterative manner) until the preferred threshold is identified that results in the desired number or frequency of alerts. The systems and methods can use, for example, an iterative technique, such as Newton's method, the bisection method, and/or interpolation. The systems and methods can choose an initial threshold and automatically adjust the threshold until the preferred threshold is reached.

Additionally or alternatively, the systems and methods described herein can identify how many of an alert recipient's affiliates result in alerts being triggered during a time period (e.g., a previous week, month, or year), for one or more alert reporting thresholds. For example, a value can be specified for the threshold and the number of alerts for each affiliate entity can be calculated for a previous time period (e.g., a previous month or year). The systems and methods can display the number of calculated alerts for each affiliate entity and/or can determine or display a number or percentage of the affiliates that trigger an alert during the time period. In some examples, the threshold can be adjusted until a desired percentage (e.g., 10%, 20%, or 50%) of the affiliates trigger alerts for the time period. The threshold adjustments can be performed automatically using iterative techniques.

Figure 10:
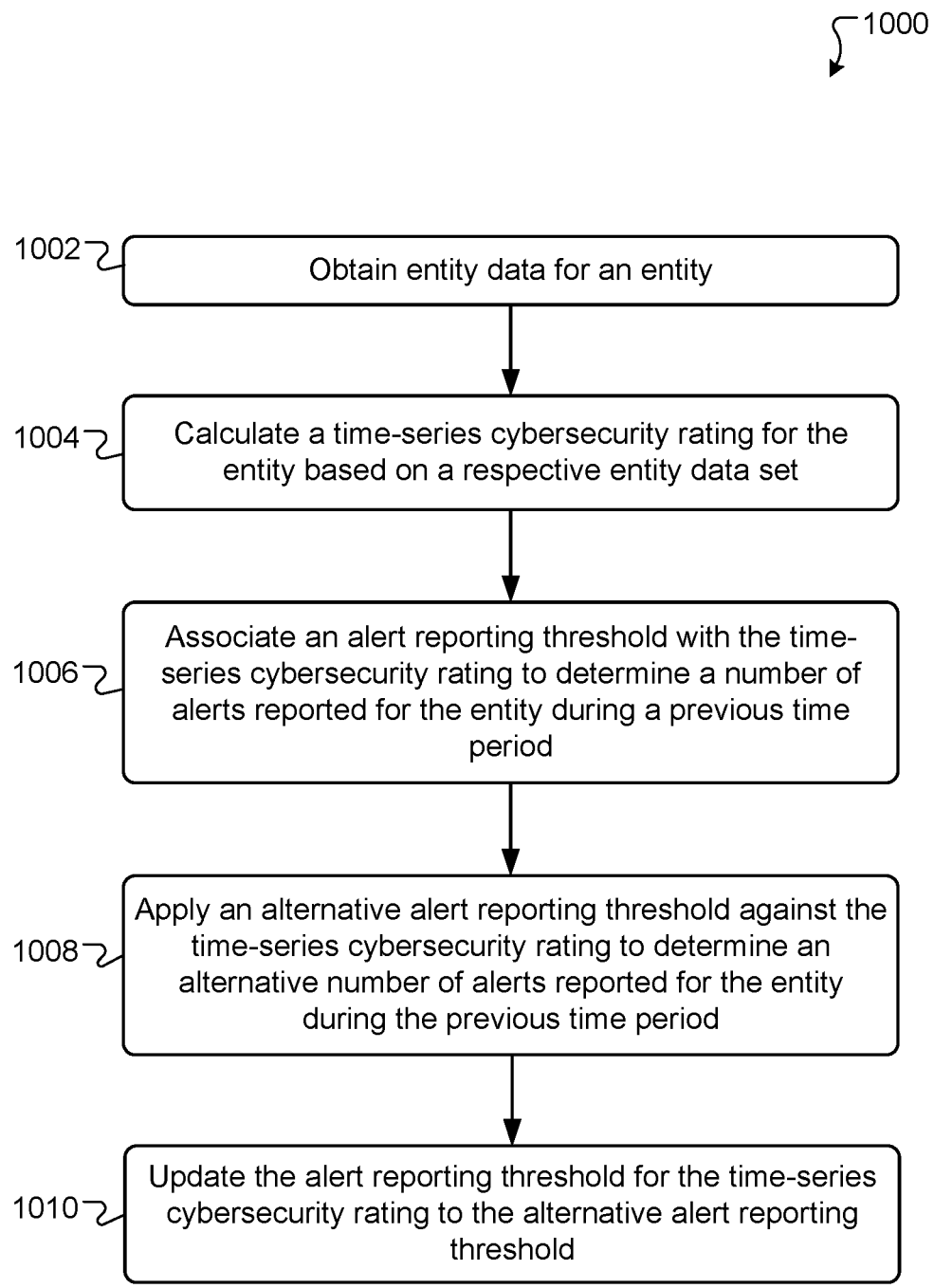
FIG. 10 is a flowchart of a method of setting alert thresholds related to cybersecurity ratings of one or more affiliate entities, in accordance with certain embodiments.

FIG. 10 is a flowchart of a method of setting alert thresholds related to security ratings of one or more affiliate entities. Entity data is obtained (step 1002) that includes a plurality of entity data sets. Each entity data set is associated with a respective affiliate entity from a plurality of affiliate entities and includes cybersecurity event data (e.g., information describing events related to cybersecurity) associated with each respective affiliate entity. A time-series cybersecurity rating is calculated (step 1004) for one of the affiliate entities based on the respective entity data set. An alert reporting threshold is associated (step 1006) with the time-series cybersecurity rating. A comparison of the alert reporting threshold to the time-series cybersecurity rating can be used to determine a number of alerts reported for the one of the affiliate entities during a previous time period. An alternative alert reporting threshold is applied (step 1008) against the time-series cybersecurity rating to determine an alternative number of alerts reported for the one of the affiliate entities during the previous time period. The alert reporting threshold for the time-series cybersecurity rating is updated (step 1010) to the alternative alert reporting threshold.

In various examples, the entity data for an affiliate entity can relate to and/or be used to determine cybersecurity risks associated with the affiliate entity. The entity data can be, include, and/or represent, for example, one or more of the following, in any combination: an amount of capital investment in security of the affiliate entity; a measure of employee training in security of the affiliate entity; a measure of organization of a team dedicated to information security; an amount of budget dedicated to information security; a number and/or severity of botnet infection instances of a computer system associated with the affiliate entity; a number of spam propagation instances originating from a computer network associated with the affiliate entity; a number of malware servers associated with the affiliate entity; a number of potentially exploited devices associated with the affiliate entity; a number of hosts authorized to send emails on behalf of each domain associated with the affiliate entity; a determination of whether a DomainKeys Identified Mail (DKIM) record exists for each domain associated with the affiliate entity and/or a key length of a public key associated with a Domain Name System (DNS) record of each domain associated with the affiliate entity; an evaluation of a Secure Sockets Layer (SSL) certificate and/or a Transport Layer Security (TLS) certificate associated with a computer system of the affiliate entity; a number and/or type of service of open ports of a computer network associated with the affiliate entity; an evaluation of security-related fields of an header section of HTTP response messages of hosts associated with the affiliate entity; a rate at which vulnerabilities are patched in a computer network associated with the affiliate entity; an evaluation of file sharing traffic originating from a computer network associated with the affiliate entity; a number of lost records and/or sensitivity of information in the lost records in a data breach of a computer system associated with the affiliate entity; a signal and/or an indication that a host has attempted to contact a service on another host without solicitation (e.g., attempt is unexpected or the service is unsupported), which may occur in some cases due to malware scanning for open network access points on other computers over the Internet; a signal and/or an indication that TLS/SSL configuration of an affiliate entity's server is proper, which can indicate that the security protocol libraries of a server associated with an affiliate entity are correctly configured and/or support strong encryption standards when making connections to other computer systems; a signal and/or an indication that affiliate entity's server system has software that is not supported by software vendors and/or is out-of-date; a presence of Sender Policy Framework (SPF) record(s) in the affiliate entity's domain (including subdomains) (e.g., of an affiliate entity's mail server system) that have sent or attempted to send an email; data indicating the operating system version and/or web browser version of one or more computer systems of the affiliate entity; a number of endpoints (e.g., computer, server, mobile device, media system, and/or appliance having Internet access) of an affiliate entity's computer system in communication with an unintended destination (e.g., a web domain that does not exist or not registered); and/or data indicating the operating system version, device description, web browser version, description of applications of one or more mobile devices in the affiliate entity's computer network. The event data can include or describe one or more cybersecurity events associated with an affiliate entity, such as, for example, an occurrence of a botnet infection of a computer system associated with the affiliate entity; a propagation of spam originating from a computer network associated with the affiliate entity; usage of a malware server associated with the affiliate entity; a signal and/or an indication that TLS/SSL configuration of an affiliate entity's server is proper; a signal and/or an indication that the affiliate entity is or is not using strong or proper encryption standards when making connections to other computer systems; a signal and/or an indication that affiliate entity's server system has software that is not supported by software vendors and/or is out-of-date. Other types of entity data and cybersecurity event data are possible.

In various examples, the subject matter of this application is related to the subject matter of U.S. patent application Ser. No. 15/377,574 titled "Methods and Systems for Creating, De-Duplicating, and Accessing Data Using an Object Storage System" and filed on Dec. 13, 2016 (now U.S. Pat. No. 9,705,932); U.S. patent application Ser. No. 14/021,585 titled "Security Risk Management" and filed on Sep. 9, 2013 (now U.S. Pat. No. 9,438,615); U.S. patent application Ser. No. 13/240,572 titled "Information Technology Security Assessment System" and filed on Sep. 22, 2011; U.S. patent application Ser. No. 14/944,484 titled "Information Technology Security Assessment System" and filed on Nov. 18, 2015 (now U.S. Pat. No. 9,973,524); U.S. patent application Ser. No. 15/142,677 titled "Security Assessment Using Service Provider Digital Asset Information" and filed on Apr. 29, 2016 (now U.S. Pat. No. 9,830,569); U.S. patent application Ser. No. 16/015,686 titled "Methods for Mapping IP Addresses and Domains to Organizations using User Activity Data" and filed on Jun. 22, 2018 (now U.S. Pat. No. 10,425,380); U.S. patent application Ser. No. 16/549,764 titled "Systems and Methods for Inferring Entity Relationships via Network Communications of Users or User Devices" and filed on Aug. 23, 2019; U.S. patent application Ser. No. 16/583,991 titled "Systems and Methods for Network Asset Discovery and Association thereof with Entities" and filed on Sep. 26, 2019; U.S. patent application Ser. No. 16/514,771 titled "Systems and methods for generating security improvement plans for entities" and filed on Jul. 17, 2019; and U.S. patent application Ser. No. 16/802,232 titled "Systems and Methods for Improving a Security Profile of an Entity Based on Peer Security Profiles" and filed on Feb. 26, 2020, each of which is hereby incorporated by reference herein in its entirety.

Computer-Based Implementations

In some examples, some or all of the processing described above can be carried out on a personal computing device, on one or more centralized computing devices, or via cloud-based processing by one or more servers. Some types of processing can occur on one device and other types of processing can occur on another device. Some or all of the data described above can be stored on a personal computing device, in data storage hosted on one or more centralized computing devices, and/or via cloud-based storage. Some data can be stored in one location and other data can be stored in another location. In some examples, quantum computing can be used and/or functional programming languages can be used. Electrical memory, such as flash-based memory, can be used.

Figure 11:
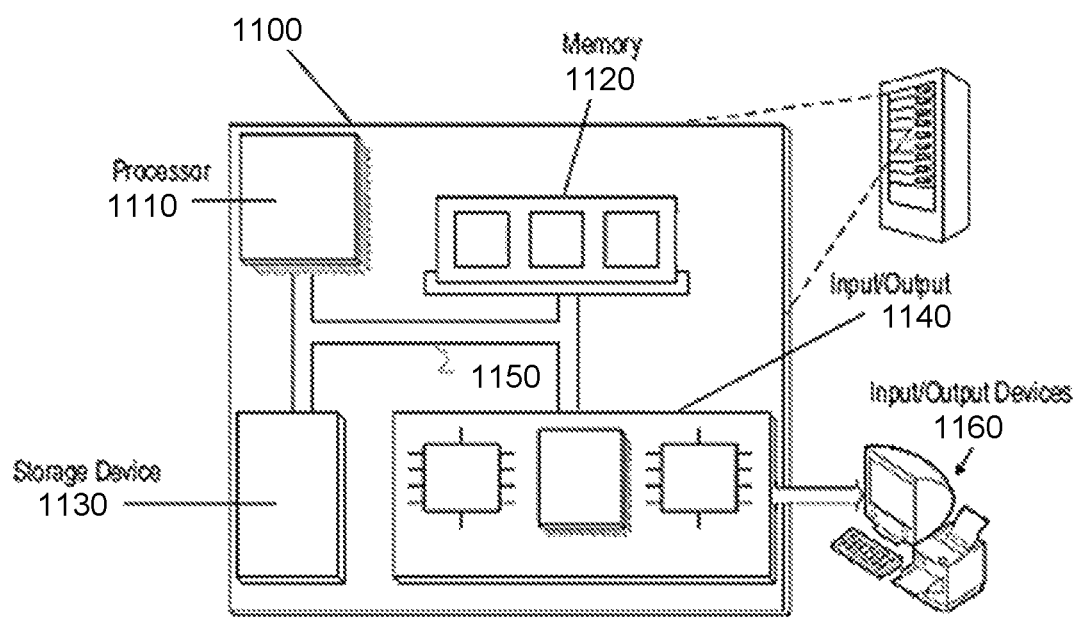
FIG. 11 is a schematic block diagram of an example computer system for determining and sending a desired number or frequency of cybersecurity alerts, in accordance with certain embodiments.

FIG. 11 is a block diagram of an example computer system 1100 that may be used in implementing the technology described herein. General-purpose computers, network appliances, mobile devices, or other electronic systems may also include at least portions of the system 1100. The system 1100 includes a processor 1110, a memory 1120, a storage device 1130, and an input/output device 1140. Each of the components 1110, 1120, 1130, and 1140 may be interconnected, for example, using a system bus 1150. The processor 1110 is capable of processing instructions for execution within the system 1100. In some implementations, the processor 1110 is a single-threaded processor. In some implementations, the processor 1110 is a multi-threaded processor. The processor 1110 is capable of processing instructions stored in the memory 1120 or on the storage device 1130.

The memory 1120 stores information within the system 1100. In some implementations, the memory 1120 is a non-transitory computer-readable medium. In some implementations, the memory 1120 is a volatile memory unit. In some implementations, the memory 1120 is a non-volatile memory unit.

The storage device 1130 is capable of providing mass storage for the system 1100. In some implementations, the storage device 1130 is a non-transitory computer-readable medium. In various different implementations, the storage device 1130 may include, for example, a hard disk device, an optical disk device, a solid-state drive, a flash drive, or some other large capacity storage device. For example, the storage device may store long-term data (e.g., database data, file system data, etc.). The input/output device 1140 provides input/output operations for the system 1100. In some implementations, the input/output device 1140 may include one or more network interface devices, e.g., an Ethernet card, a serial communication device, e.g., an RS-232 port, and/or a wireless interface device, e.g., an 802.11 card, a 3G wireless modem, or a 4G wireless modem. In some implementations, the input/output device may include driver devices configured to receive input data and send output data to other input/output devices, e.g., keyboard, printer and display devices 1160. In some examples, mobile computing devices, mobile communication devices, and other devices may be used.

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device 1130 may be implemented in a distributed way over a network, such as a server farm or a set of widely distributed servers, or may be implemented in a single computing device.

Although an example processing system has been described in FIG. 11, embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array) or an ASIC (application specific integrated circuit). A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

Terminology

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

What is claimed is:

1. A computer-implemented method of setting alert thresholds related to cybersecurity ratings of one or more affiliate entities, the method comprising:
    obtaining entity data comprising a plurality of entity data sets, each entity data set associated with a respective affiliate entity from a plurality of affiliate entities and comprising cybersecurity event data associated with each respective affiliate entity;
    calculating a time-series cybersecurity rating for one or more of the affiliate entities based on the respective entity data set;
    associating an alert reporting threshold with the time-series cybersecurity rating,
        wherein a comparison of the alert reporting threshold to the time-series cybersecurity rating determines a number of alerts reported for the one or more affiliate entities;
    applying an alternative alert reporting threshold against the time-series cybersecurity rating to determine an alternative number of alerts reported for the one or more affiliate entities; and updating the alert reporting threshold for the time-series cybersecurity rating to the alternative alert reporting threshold.

2. The method of claim 1, wherein the plurality of affiliate entities comprises affiliates of an intended recipient of the alerts.

3. The method of claim 1, wherein the time-series cybersecurity rating comprises a history of cybersecurity ratings during a previous time period.

4. The method of claim 1, wherein the alert reporting threshold comprises a threshold cybersecurity rating.

5. The method of claim 1, wherein the alert reporting threshold comprises a threshold rate of change in the time-series cybersecurity rating.

6. The method of claim 1, wherein alerts are generated periodically while the time-series cybersecurity rating is either above or below the alert reporting threshold.

7. The method of claim 1, wherein applying an alternative alert reporting threshold comprises iterating on the alert reporting threshold to achieve a desired number of alerts reported for the one or more affiliate entities during a previous time period.

8. The method of claim 7, wherein iterating on the alert reporting threshold comprises receiving a user-specified desired number of alerts.

9. The method of claim 1, wherein applying an alternative alert reporting threshold comprises iterating on the alert reporting threshold until a desired number of affiliate entities from the one or more affiliate entities trigger alerts during a previous time period.

10. The method of claim 1, further comprising sending alerts to an intended recipient during a future time period using the updated alert reporting threshold.

11. A system comprising:
one or more computer systems programmed to perform operations comprising:
obtaining entity data comprising a plurality of entity data sets, each entity data set associated with a respective affiliate entity from a plurality of affiliate entities and comprising cybersecurity event data associated with each respective affiliate entity;
calculating a time-series cybersecurity rating for one or more of the affiliate entities based on the respective entity data set;
associating an alert reporting threshold with the time-series cybersecurity rating,
wherein a comparison of the alert reporting threshold to the time-series cybersecurity rating determines a number of alerts reported for the one or more affiliate entities;
applying an alternative alert reporting threshold against the time-series cybersecurity rating to determine an alternative number of alerts reported for the one or more affiliate entities; and
updating the alert reporting threshold for the time-series cybersecurity rating to the alternative alert reporting threshold.

12. The system of claim 11, wherein the plurality of affiliate entities comprises affiliates of an intended recipient of the alerts.

13. The system of claim 11, wherein the alert reporting threshold comprises a threshold cybersecurity rating.

14. The system of claim 11, wherein the alert reporting threshold comprises a threshold rate of change in the time-series cybersecurity rating.

15. The system of claim 11, wherein alerts are generated periodically while the time-series cybersecurity rating is either above or below the alert reporting threshold.

16. The system of claim 11, wherein applying an alternative alert reporting threshold comprises iterating on the alert reporting threshold to achieve a desired number of alerts reported for the one or more affiliate entities during a previous time period.

17. The system of claim 16, wherein iterating on the alert reporting threshold comprises receiving a user-specified desired number of alerts.

18. The system of claim 11, wherein applying an alternative alert reporting threshold comprises iterating on the alert reporting threshold until a desired number of affiliate entities from the one or more affiliate entities trigger alerts during a previous time period.

19. The system of claim 11, the operations comprising sending alerts to an intended recipient during a future time period using the updated alert reporting threshold.

20. A non-transitory computer-readable medium having instructions stored thereon that, when executed by one or more computer processors, cause the one or more computer processors to perform operations comprising:
obtaining entity data comprising a plurality of entity data sets, each entity data set associated with a respective affiliate entity from a plurality of affiliate entities and comprising cybersecurity event data associated with each respective affiliate entity;
calculating a time-series cybersecurity rating for one or more of the affiliate entities based on the respective entity data set;
associating an alert reporting threshold with the time-series cybersecurity rating,
wherein a comparison of the alert reporting threshold to the time-series cybersecurity rating determines a number of alerts reported for the one or more affiliate entities;
applying an alternative alert reporting threshold against the time-series cybersecurity rating to determine an alternative number of alerts reported for the one or more affiliate entities; and
updating the alert reporting threshold for the time-series cybersecurity rating to the alternative alert reporting threshold.

* * * * *